(12) United States Patent
Boldyrev et al.

(10) Patent No.: US 8,285,859 B2
(45) Date of Patent: Oct. 9, 2012

(54) METHOD AND APPARATUS FOR OPTIMIZING DISTRIBUTION OF INFORMATION AND QUERIES IN INFORMATION SPACES

(75) Inventors: Sergey Boldyrev, Söderkulla (FI); Ian Justin Oliver, Söderkulla (FI); Antti Lappetelainen, Espoo (FI); Jukka Honkola, Espoo (FI)

(73) Assignee: Nokia Corporation, Espoo (FI)

( * ) Notice: Subject to any disclaimer, the term of this patent is extended or adjusted under 35 U.S.C. 154(b) by 293 days.

(21) Appl. No.: 12/623,184

(22) Filed: Nov. 20, 2009

(65) Prior Publication Data

US 2011/0125881 A1    May 26, 2011

(51) Int. Cl.
G06F 15/16 (2006.01)
G06F 15/173 (2006.01)
(52) U.S. Cl. ........ 709/228; 709/223; 709/226; 709/238; 709/239
(58) Field of Classification Search ............. 709/223, 709/226, 239; 714/47.2, 472; 370/254
See application file for complete search history.

(56) References Cited

U.S. PATENT DOCUMENTS

| | | | |
|---|---|---|---|
| 6,163,844 A | 12/2000 | Duncan et al. | |
| 6,550,024 B1 * | 4/2003 | Pagurek et al. | 714/47.2 |
| 7,401,101 B2 | 7/2008 | Hild et al. | |
| 7,577,663 B2 | 8/2009 | Crispo et al. | |
| 2001/0037302 A1 | 11/2001 | McFadzean et al. | |
| 2004/0267875 A1 | 12/2004 | Hennessey et al. | |
| 2007/0239695 A1 | 10/2007 | Chakra et al. | |
| 2010/0142402 A1 * | 6/2010 | Boldyrev et al. | 370/254 |

OTHER PUBLICATIONS

A Mechanism for Managing and Distributing Information and Queries in a Smart Space Environment, Boldyrev et al., in: Ubiquitous Computing and Communication Journal, Special Issue of the 1st International Workshop on Managing Data with Mobile Devices (MDMD 2009), Jul. 30, 2009, pp. 1-10.
International search report and written opinion for corresponding international application No. PCT/FI2010/050829 dated Feb. 16, 2011, pp. 1-14.
M3 smart spce infrastructure, Soininen et al., Proceedings of the 2nd NoTA, Sep. 30-Oct. 1, 2009, pp. 1-20.
Operations on Spaces of Information, Oliver et al., 2009 IEEE International Conference on Semantic Computing, Sep. 14-16, 2009, pp. 267-274.
Ambite, J. et al. ARIADNE: A system for constructing mediators for Internet sources (system demonstration). In: Proc. of ACM SIGMOD Conf. on Management of Data,New York:ACM Press,1998. 561-563.
Gupta, R. et al., Optimized query planning of continuous aggregation queries in dynamic data dissemination networks, Proceedings of the 16th international conference on World Wide Web, May 8-12, 2007, Banff, Alberta, Canada.

(Continued)

*Primary Examiner* — Quang N. Nguyen
(74) *Attorney, Agent, or Firm* — Ditthavong Mori & Steiner, P.C.

(57) ABSTRACT

An approach is provided for managing symmetric and asymmetric communication among information spaces with respect to their distributed nature. An information space is composed of semantic information brokers that handle internal processes of the information space. One or more of the semantic information brokers compute a stability factor corresponding to each of a plurality of semantic information brokers in an information space. The one or more semantic information brokers then select one or more of the plurality of semantic information brokers as a master semantic information broker based on the computed stability factors. The one or more master semantic information brokers manage communication among the plurality of semantic information brokers.

20 Claims, 17 Drawing Sheets

OTHER PUBLICATIONS

Oliver I. et al., Personal Semantic Web Through a Space Based Computing Environment, In proceedings: Middleware for the Semantic Web, Seconds IEEE Interntional Conference on Semantic Computing, Santa Clara, CA, USA, Aug. 4-7, 2008.

Olston, C. et al., Adaptive filters for continuous queries over distributed data streams, Proceedings of the 2003 ACM SIGMOD international conference on Management of data, Jun. 9-12, 2003, San Diego, California.

Trigoni, N. et al., Multi-Query Optimization for Sensor Networks. International Conference on Distributed Computing in Sensor Systems (DCOSS 2005).

Zhang, K. et al., Query planning for the grid: adapting to dynamic resource availability, Proceedings of the Fifth IEEE International Symposium on Cluster Computing and the Grid (CCGrid'05)—vol. 2, p. 751-758, May 9-12, 2005.

* cited by examiner

300

310

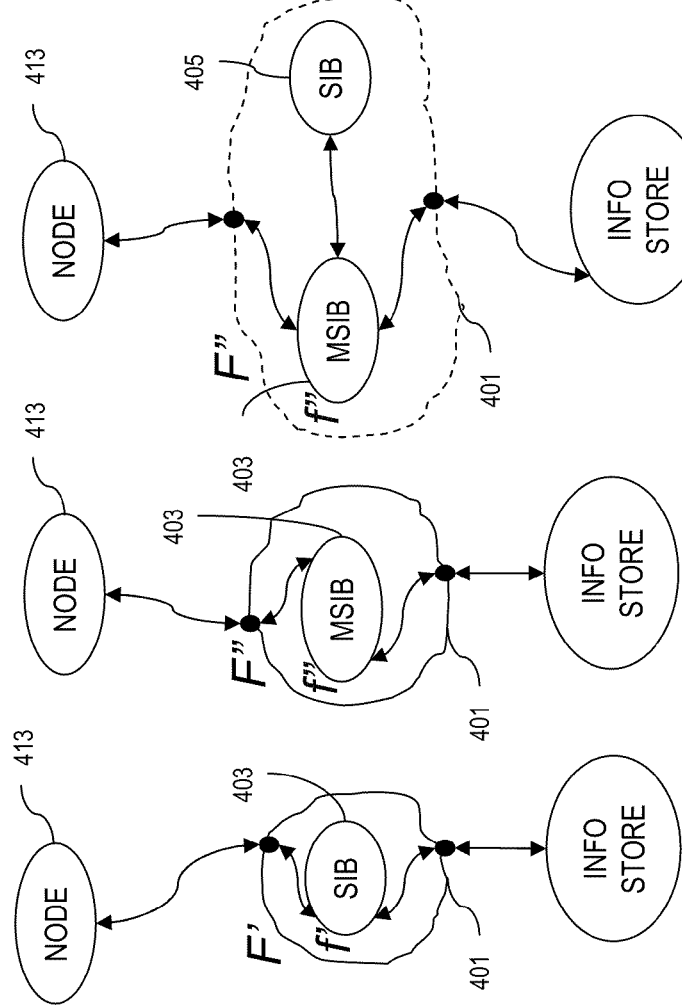
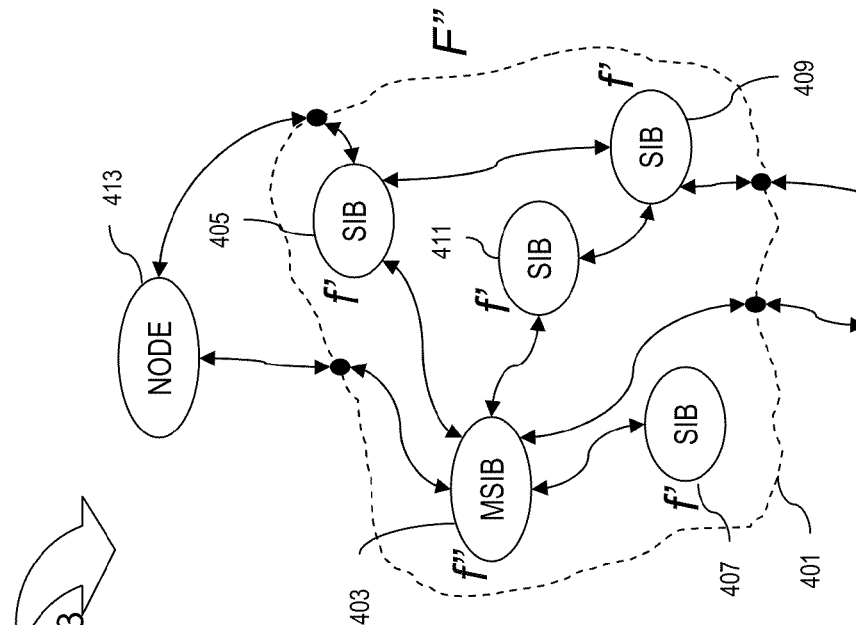
FIG. 4A  FIG. 4B  FIG. 4C  FIG. 4D

METHOD AND APPARATUS FOR OPTIMIZING DISTRIBUTION OF INFORMATION AND QUERIES IN INFORMATION SPACES

BACKGROUND

Mobile devices with various methods of connectivity are now for many people becoming the primary gateway to the internet and also a major storage point for personal information. This is in addition to the normal range of personal computers, servers, applications, services, and the like that cater to information storage and processing. As part of this trend, service providers and device manufacturers are combining and providing interoperability among these myriad information processing devices, applications, and services. More specifically, one area of development has been the processing of information through numerous, individual and personal spaces in which persons, groups of persons, etc. can place, share, interact and manipulate webs of information with their own locally agreed semantics without necessarily conforming to an unobtainable, global whole. These information spaces, often referred to as smart spaces, are projections of the 'Giant Global Graph' in which one can apply semantics and reasoning at a local level. However, the heterogeneity of available information and information formats create significant technical challenges for distributing and processing information using such information spaces.

Therefore, there is a need for an approach for optimizing information and query distribution in information spaces or among semantic information brokers that support the operation of the information spaces.

SOME EXAMPLE EMBODIMENTS

According to one embodiment, a method comprises receiving a request, from a device, to perform an information management operation or query directed at one or more semantic information brokers. The method also comprises determining provenance, ownership, or privacy of information within the one or more semantic information brokers. The method further comprises determining a strategy for distributing the operation or query among the one or more semantic information brokers based, at least in part, on the provenance, ownership, or privacy information. The method further comprises distributing the operation or query among the one or more semantic information brokers according to the determined strategy.

According to another embodiment, an apparatus comprising at least one processor, and at least one memory including computer program code, the at least one memory and the computer program code configured to, with the at least one processor, cause, at least in part, the apparatus to a request, from a device, to perform an information management operation or query directed at one or more semantic information brokers. The apparatus is also caused to determine provenance, ownership, or privacy of information within the one or more semantic information brokers. The apparatus is further caused to determine a strategy for distributing the operation or query among the one or more semantic information brokers based, at least in part, on the provenance, ownership, or privacy information. The apparatus is further caused to distribute the operation or query among the one or more semantic information brokers according to the determined strategy.

According to another embodiment, a computer-readable storage medium carrying one or more sequences of one or more instructions which, when executed by one or more processors, cause, at least in part, an apparatus to a request, from a device, to perform an information management operation or query directed at one or more semantic information brokers. The apparatus is also caused to determine provenance, ownership, or privacy of information within the one or more semantic information brokers. The apparatus is further caused to determine a strategy for distributing the operation or query among the one or more semantic information brokers based, at least in part, on the provenance, ownership, or privacy information. The apparatus is further caused to distribute the operation or query among the one or more semantic information brokers according to the determined strategy.

According to yet another embodiment, an apparatus comprises means for receiving a request, from a device, to perform an information management operation or query directed at one or more semantic information brokers. The apparatus also comprises means for determining provenance, ownership, or privacy of information within the one or more semantic information brokers. The apparatus further comprises means for determining a strategy for distributing the operation or query among the one or more semantic information brokers based, at least in part, on the provenance, ownership, or privacy information. The apparatus further comprises means for distributing the operation or query among the one or more semantic information brokers according to the determined strategy.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4D are diagrams of information space evolution, according to one embodiment;

DESCRIPTION OF SOME EMBODIMENTS

Figure 1:
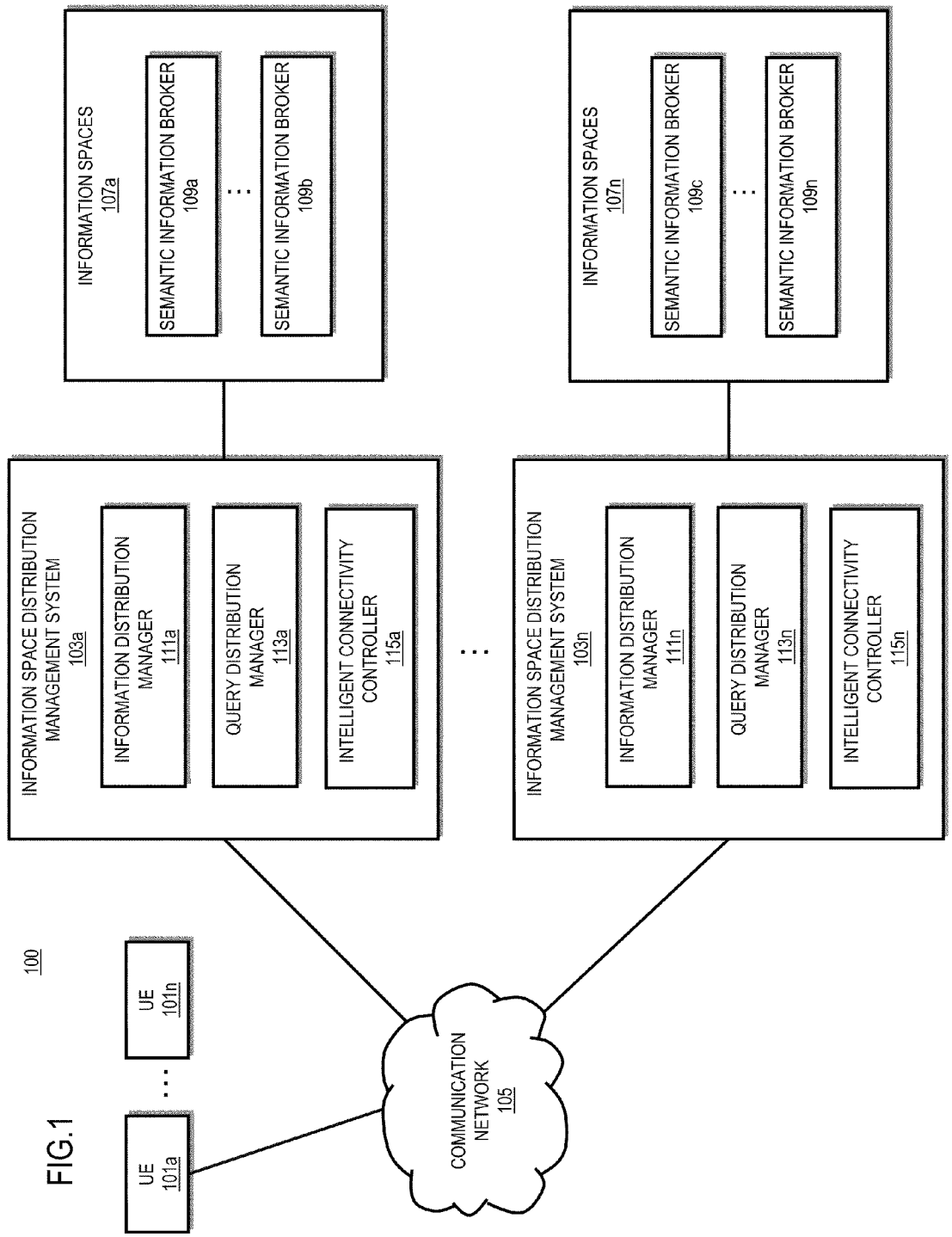
FIG. 1 is a diagram of a system capable of optimization of information and query distribution in information spaces, according to one embodiment.

Examples of a method, apparatus, and computer program for optimization of information and query distribution in information spaces are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term Semantic Information Broker (SIB) refers to a physical component or set of physical components (e.g., computer hardware, networking infrastructure) that provide the underlying physical infrastructure for information spaces. By way of example, an information space or smart space can be considered as an information set aggregated from a variety of different and distributed sources. The multi-sourcing of information gives an information space great flexibility and accounts for the fact that the same piece of information can come from different sources. In one embodiment, an information space infrastructure defines user access to the information space through SIBs. Because the infrastructure of an information space can be distributed, an information space may be represented by one or more SIBs. It is also assumed that user access to an information space is through a network of nodes each acting as an interface between users and SIBs where none of the nodes is aware of the overall topology of the information space. Each node, however, is aware of its adjacent nodes or neighbors. Although various embodiments are described with respect to SIB, it is contemplated that the approach described herein may be used with other equipment used for information space manipulation and their combinations thereof.

Moreover, in an information space, information requested by a user may be distributed over several information sets. However, information and queries are not always distributed symmetrically. In other cases, symmetric distribution of information and queries is not always possible or desirable. For example, information may be accumulated at particular locations (e.g., a particular SIB) more densely than in other locations within an information space. Furthermore, queries that are being imposed on a system of information spaces by users may be distributed symmetrically or asymmetrically. The network architecture, hardware capabilities, data ownership issues, uses privileges, and other similar factors may affect the distribution of information and queries such that higher volumes of information or queries may be directed to some parts of the information space over other parts thereby creating information volume disparities.

In addition, lack of control over symmetric or asymmetric distribution of information and queries within and among information spaces may cause difficulty in providing reliable and sustained distributed information management. This problem is particularly acute when multiple information spaces need to communicate among themselves.

The system 100 of FIG. 1 addresses these problems by introducing the capability to automatically and efficiently optimize the distribution of information and queries in information spaces by using a system of self-monitoring and self-maturing network of SIBs. The system 100 also introduces consideration of symmetric and asymmetric distribution modes to create a baseline for controllable information management between multiple information spaces in terms of information ownership and provenance.

FIG. 1 is a diagram of a system capable of optimization of information and query distribution in information spaces, according to one embodiment. As shown in FIG. 1, the system 100 comprises user equipment (UE) 101a-101n having connectivity to a distribution management system comprised of one or more 103a-103n via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

As shown in FIG. 1, UEs 101a-101n have connectivity to the information spaces 107a-107n through the communication network 105. Each of the information spaces 107a-107k includes one or more semantic information brokers (SIBs) 109a-109n. In addition, each of the information spaces 107a-107k is associated with a respective distribution management system 103a-103n that consists of components for determining information and query distribution. For example, the distribution management systems 103a-103n manage the interactions among the information spaces 107a-107n, the SIBs 109a-109n, the UEs 101a-101n, and other nodes of the network 105 (not shown).

In one embodiment, a user equipment 101 may be used by an owner of the information stored in one or more information spaces 107a-107k for information updates. For example, the information owner may want to perform an information management operation (e.g., remove, insert or replace (remove and insert)) on information in the information spaces 107a-107k under the owner's control. To initiate this process, the owner sends a message indicating the desired modification. The distribution management systems 103a-103n receive the message and the respective information distribution manager 111a-111n redirects the message to a SIB 109 within the desired information space 107. As part of the redirection, the information distribution manager 111a-111n determines a strategy for distribution based on either symmetric or asymmetric distribution. Selection of symmetric or asymmetric distribution depends on, for instance, privacy, ownership, or provenance information associated with the information on which the requested operation is to be performed. In certain embodiments, before the message is redirected, the information distribution manager 111a-111n verifies the user's profile or credentials to check whether the user has modification or access rights to the information. The information distribution manager 111a-111n also determines the most efficient way to access the information by referring to access protocols, agreements, device specifications, etc. In various case scenarios, there can be more than one SIB 109 capable of applying the requested modifications and more than one information distribution management system 103a-103n per each information space 107. For example, the information space 107 may contain multiple SIBs 109a-109n with access to the same information. In such cases, the information distribution manager 111a-111n determines the most suitable SIB 109 by referring to the characteristics specific to each candidate SIB 109 such as a stability level or factor associated with the SIB 109.

Each SIB 109 has a certain stability factor based on various factors such as network architecture, data ownership, security restrictions, hardware infrastructure, connectivity controller information, environment information, physical means, information management infrastructure, etc. In one embodiment, the stability factor is synonymous with an importance factor or priority corresponding to the each SIB 109. The stability factor, for instance, is used by the system 100 in finding the most stable set of information to which a query can be directed.

For example, on receipt of a request from the UE 101 to modify the information in the information space 107, the information distribution manager 111a-111n redirects the request to the determined SIB 109 where the modifications are applied on the information.

In another example, a user may want to retrieve information from one or more information spaces 107. The user sends a query to the distribution management system 103a-103n via a user equipment 101 through the communication network 105. The distribution management system 103a-103n redirects the query to the query distribution manager 113a-113n. In one embodiment, the redirection is performed using either symmetric or asymmetric distribution as described above with respect to the information distribution manager 111a-111n. The query distribution manager 113a-113n determines the most suitable SIB 109 for answering the query by referring to the characteristics specific to each candidate SIB 109 such as a stability level or factor as described above.

In one embodiment, a stability factor is constructed based on the information aggregated from information collected by the intelligent connectivity controller 115 related to the SIB 109 such as network properties, information provided by other SIBs 109, number of previous hits on the SIB 109, number of queries satisfied by the SIB 109, and some other additional valuable environmental information. The stability factor is a result of superposition between information which is provided by the intelligent connectivity controller 113 (e.g. physical means which form computing environment) and the information management infrastructure. The intelligent connectivity controller 115 is aware of its surrounding environment in addition to its local connectivity capabilities. It may also be aware of the physical limitations and of individual devices (e.g., UEs 101, SIBs 109) within the wireless range or within the associated wired network. The aim of the interface provided by the controller to the distributed framework component is to provide enough, yet abstract connectivity, properties from the participating devices to the distributed network of SIBs 109 within the information space 107. In addition, the controller 115 hides the complexity of multi transport control mechanisms as a connectivity cost function interface.

By way of example, the UEs 101a-101n, distribution management systems 103a-103n, information spaces 107a-107n, and semantic information brokers 109a-109a, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

Figure 2:
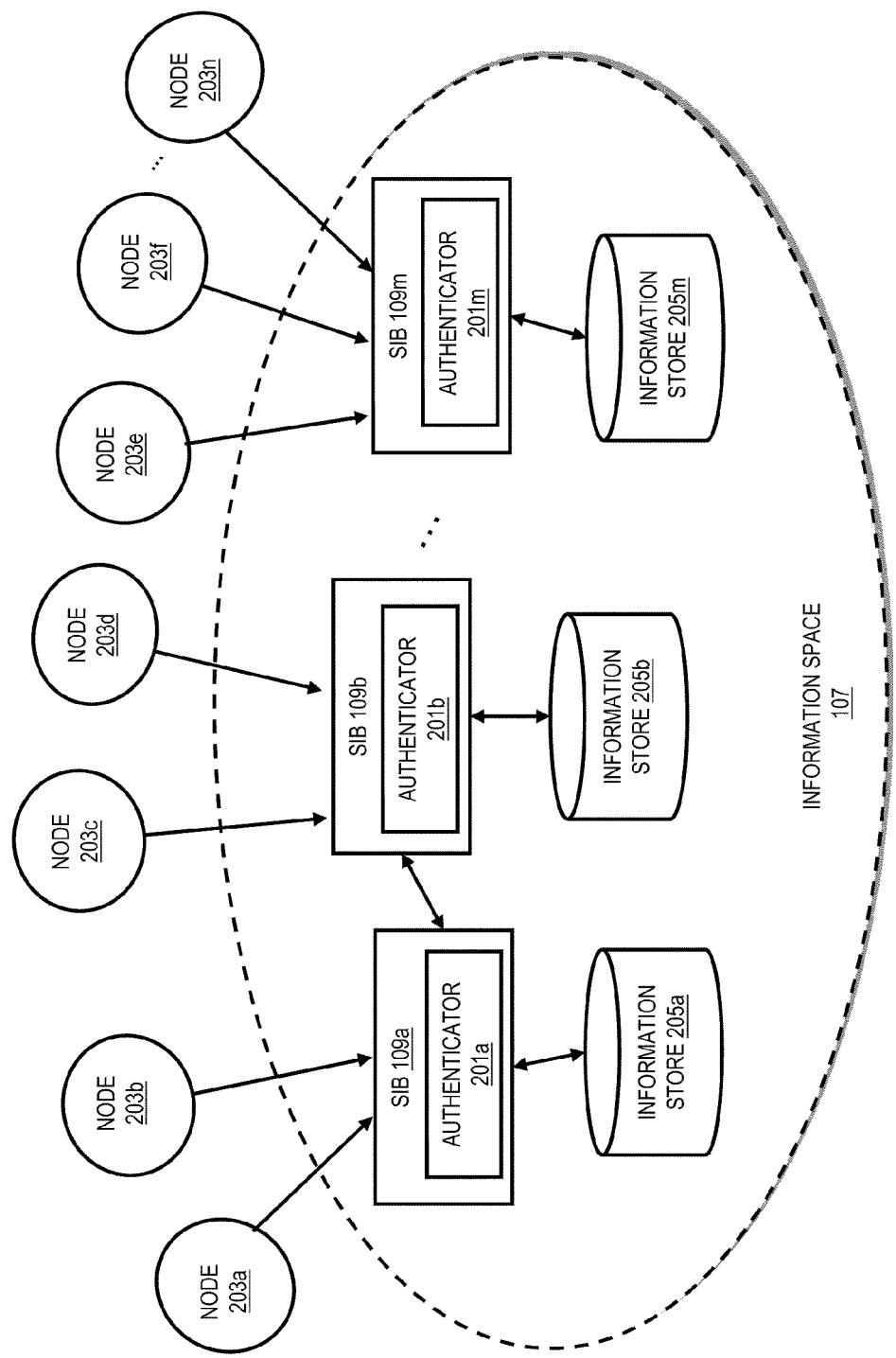
FIG. 2 is a diagram of the components of an information space, according to one embodiment.

FIG. 2 is a diagram of the components of an information space, according to one embodiment. An information space 107 is composed of one or more SIB 109a-109m where each SIB 109 can belong only to one information space 107. As discussed previously, SIBs are computation elements that form the information processing component of an information system.

The infrastructure of an information space 107 is such that all the SIBs 109a-109m of the information space 107 can receive all of the messages arriving at any other SIBs 109a-109m within the same information space 107. Additionally, all messages passed on by each SIB 109 appear to have been sent from the information space 107. Furthermore, the infrastructure presumes that any two of the SIBs 109 belonging to a single information space 107 are able to communicate with each other. Each SIB 109a-109m has an authenticator 201a-201m that verifies the authentication of the messages the respective SIB 109 receives from nodes 203a-203n (e.g., UEs 101). The nodes 203a-203n can be any equipment such as mobile devices, personal computers, etc. An SIB 109 initiates processing of the received message only after the sender is approved by the respective authenticator 201. Each SIB 203a-203m is also connected to an information store 205a-205m whose contents are accessed and altered by users of the information system 100 by sending messages to the information space 107 through the communication network 105.

In one embodiment, queries and information can be symmetrically or asymmetrically distributed among SIBs 109 such that query processing can be optimized whereby queries are processed in an efficient way with the most stable set of information possible. As a mechanism for comparing the stability of SIBs, a priority or stability level is assigned to each individual processing element (SIB).

A stable (reliable) distribution of information and queries among multiple SIBs 109 is shaped through the relationship between the stability factor and strategies that form feasible solutions for distributed access to information. The stability factor is defined in close connection with the strategies. Some of the strategies that may be considered are: distribution of information inserts/retracts around all infrastructure and putting queries on any stable SIB 109; distribution of queries around all infrastructure and putting information insert/retract on any stable SIB 109; or a balanced strategy between the first and the second strategies.

In the approach described herein, SIBs 109 communicate internally to validate membership and credentials of external SIBs 109 that have joined or request to join an information space 107. The connection to validate membership and credentials may take place via any SIB 109 in the information space 107. From the point of view of an external node (e.g., the UE 101) accessing the information space 107, the information available is the distributed union over the transitive closure of the routes between all the SIBs 109 within the information space 107. Each SIB 109 contains routing tables to other SIBs 109, and within an information space 107, all the SIBs 109 are totally routable but not necessarily totally connected.

In one embodiment, all SIBs 109 within the information space 107 are able to see all data packets (messages) exchanged within the information space 107. The SIBs 109 also can apply an incremental routing technique to forward the messages to the appropriate SIB 109. By way of example, the transparency level of the data can be driven by biased importance factor and symmetric/asymmetric distribution mode, taking the ownership, delay and query satisfaction as the most important inputs at this stage.

Figure 3A:
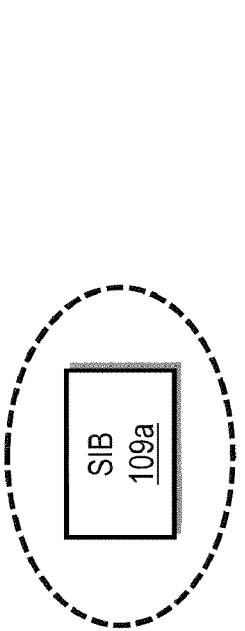
FIGS. 3A-3C are diagrams of semantic information broker distribution, according to one embodiment.
Figure 3B:
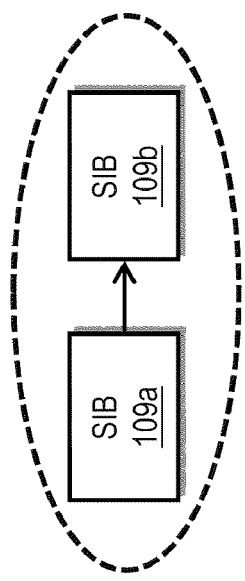
Figure 3C:
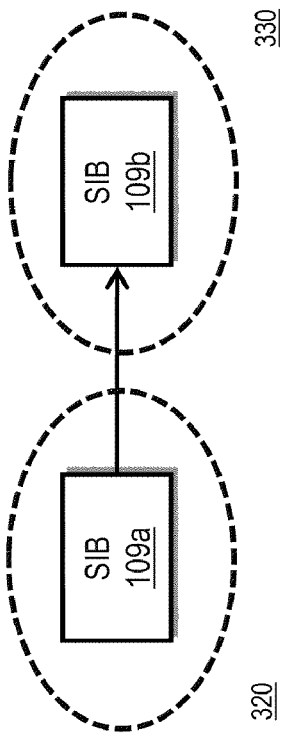

FIGS. 3A-3C are diagrams of semantic information broker distribution schemes, according to various embodiments. As discussed previously, each information space 107 may have one or more SIBs 109 which communicate with each other to constitute the information space 107. Furthermore, in order for any two separate information spaces 107 to communicate and exchange information, the SIBs 109 from the respective information spaces 107 should also be able to communicate with each other. The distributed nature of information spaces and the fact that each information space 107 may have one or more SIBs 109, introduce the issue of symmetric and asymmetric information distribution and query distribution in a consistent manner across multiple computational elements that form the information processing system of an information space 107.

As used herein, the term symmetric information and/or query distribution refers to, for instance, the distribution of information and/or queries to two or more SIBs 109 that have the same owners. Because of the common ownership of such SIBs 109, the information and/or queries can be the same (e.g., symmetric) and need not include provenance (e.g., ownership) information that is different for each respective SIB 109 in common ownership. In contrast, asymmetric distribution of information and/or queries refers to distribution among SIBs 109 associated with information spaces 107 with different owners. In one embodiment, distribution of information over SIBs 109 of different ownership occurs via asymmetric distribution in order to preserve ownership information with respect to each SIB 109. In other words, provenance information associated with data stored in each respective SIB 109 is used to record the owner of the information. Ownership information is maintained, for instance, to determine the rights attached to the data in the SIBs 109 to ensure that any transfer or distribution of data complies with legal, contractual, or other rights or restrictions. Accordingly, in the approach described herein, the system 100 of FIG. 1 can determine whether the strategy it uses for distribution information or queries includes symmetric and/or asymmetric distribution based on the privacy, ownership, or provenance of the corresponding information. In one embodiment, the strategy is also based, at least in part, on whether the requestor of the information or query has the credentials or rights to access or otherwise manipulate the information of the SIBs 109.

In one embodiment, each SIB 109 has a certain level of stability and priority based on various factors such as network architecture, data ownership, security restrictions, hardware infrastructure, etc. Therefore, information and queries can be symmetrically or asymmetrically distributed such that the information can be accessed and processed more efficiently, and also the queries can be processed in the most efficient way using the most stable set of information.

FIG. 3A is a diagram of an information space 300 consisting of one SIB 109a. In the example of FIG. 3A, no distribution of semantic information occurs because the information space 300 includes only one SIB 109a. Therefore, no distribution schemed (e.g., symmetric or asymmetric distribution) is employed in the case of the information space 300 that includes only one SIB 109a. In other words, the entirety of the information space 300 is provided by the SIB 109a operating on its own. Therefore, there is no other SIB with which the SIB 109a communicates for distribution information and/or queries.

FIG. 3B is a diagram of an information space 310 with two SIBs, namely 109a and 109b. In this example, the SIBs 109a and 109b operate within the same information space 310, and therefore, are under common ownership. Within the information space 310, the two SIBs 109a and 109b communicate among themselves to update information and/or respond to queries directed to the information space 107. In general, the distribution of information between the two SIBs 109a and 109b is nominally symmetric because of the common ownership. However, in certain embodiments, various factors such as hardware, network bandwidth and other aspects may affect the symmetry and cause the SIBs 109a and 109b to operate via asymmetric distribution. The asymmetry that may exist in this situation is voluntary and is not forced upon the information space 107 by the communication network 105. Therefore, in the example of FIG. 3B, the default information distribution scheme for the information space 310 containing at two (or more) SIBs 109a and 109b is symmetric, but the information space 310 may nonetheless optionally operate in an asymmetric mode based on the factors listed above.

FIG. 3C is a diagram showing communication among SIBs 109a and 109b which belong to different information spaces 320 and 330 respectively. In this example, distribution among the SIBs 109a and 109b is asymmetric due to, for instance, legal issues, information ownership issues or other reasons. For example, legal issues (e.g., copyrights) may prevent or restrict the transfer of data owned by the information space 320 to the information space 330 or vice versa. In this situation, asymmetric information distribution can be used. As discussed above, ownership of information is preserved when data or information is transferred between information spaces of different ownership unless the donating information space allows such transfer or provides for joint ownership of the data to be transferred. In one embodiment, recording of provenance or ownership information can be achieved by utilizing signatures to sign the data to be transferred. The ownership signatures are then preserved across the distribution.

By way of example, ownership signatures are irreducible polynomial expressions of ownership or provenance information that has been transformed or synthesized by, for instance, cyclotomic polynomial extensions. These ownership signatures may be distributed and stored symmetrically or asymmetrically among the SIBs 109a-109n in the information spaces 107a-107n. As SIBs 109a-109n join or leave an information space 107, the information content of the information space 107 may also change. Accordingly, the ownership signatures corresponding to the information may be regularly or irregularly re-synthesized or updated to ensure that the signatures accurately represent the ownership or provenance of the corresponding information.

If ownership is not a concern, then symmetric distribution may be used for distribution of information between two SIBs 109a and 109b that are in information spaces 107 belong to different owners. By way of example, symmetric distribution may occur through synchronization of data between two information spaces 107. In one embodiment, the synchronization can occur before a mutual join operation of the two information spaces 107. In another embodiment, the two information spaces 107 are not joined following synchronization. In this case, each information space 107 proceeds on its own life-cycle following synchronization. For example, each information space 107 may be modified independently of the other space 107 and the information between the two information spaces 107 are not automatically synchronized or otherwise linked.

In a sample use case, a user may want to join two separate information spaces 107 that the user has ownership rights to. In order to avoid inconsistencies, the user may need to synchronize contents of the two information spaces before joining them. In this case symmetric information distribution between the two information spaces is used.

In another sample use case, a user may have access rights to an information space represented by several SIBs 109 where one or more of the SIBs 109 reside on a server owned by a different entity (e.g., OVI® server) than the user. In this case, the use typically may access the data on the server, but may not own the data itself. For example, in a music subscription service, the user may download any number of music tracks but does not own the music tracks themselves. In other words, the user will be allowed to read information from the server space by queries. The user may also be allowed to copy parts of the information from the server space to the user owned personal space, according to an agreement signed between the user and the information owner, but the user does not own the information. The distribution protocol for this example must preserve the ownership of any information that is copied into the user's information space. Even if the owner of the information allows transfer or joint ownership of the information, the arrangements and permissions need to be recorded as part of the distribution mechanism.

By way of example, communication among information spaces 107 is performed by means of the adaptive designation of one SIB 109 within the information space 107 as a "master" SIB or mSIB in any given information space 107. Moreover, in order to assign processes to the SIBs 109, predetermined identifiers (e.g., keys) can be used. For example, keys are used to identify each message session to determine whether a certain SIB 109 should process a particular message and also to identify which SIB 109 is responsible for processing which message type. Keys are also used to direct messages within the information space 107 for workload balancing among all SIBs 109 related to the information space 107.

In one embodiment, one or more SIBs 109 can constitute one information space 107. However, one SIB 109 is not a member of more than one information space 107. It is noted that once more than one information space 107 exists, there is a possibility of establishing a connection between SIBs 109 of the multiple information spaces 107. In one embodiment, the mSIBs with highest values of importance factors in their respective information spaces 107 may connect to each other. In another embodiment, only one mSIB from each side can establish such connection. The main property of such connection is that it uses asymmetric information distribution as described above.

FIGS. 4A-4D are diagrams of information space evolution, according to one embodiment. More specifically, the examples of FIGS. 4A-4D depict the progression of a self-monitoring and self-maturing information space infrastructure 401. FIG. 4A shows a newly constructed information space infrastructure 401. The information space infrastructure 401 consists of one SIB 403. The uppercase letter F represents the stability factor of the information space infrastructure 401 while the lowercase f represents the stability factor of the SIB 403. The addition of one or more apostrophes to the representation of stability factor represent higher values, for example F'>F and f''>f'.

FIG. 4B depicts the next step of the evolution of the information space infrastructure 401 involving the designation of a master SIB (mSIB). As shown in FIG. 4B, since SIB 403 is the only SIB in the information space infrastructure 401, the SIB 403 is designated as an mSIB and given master privileges. These privileges include, for instance, tracking and monitoring the routing of messages within the information space infrastructure 401. In one embodiment, introduction or designation of an mSIB increases the overall stability factor of the SIB 403 (from f' to f'') that has received the mSIB designation. Based on the increased stability of the SIB 403, the stability factor of the infrastructure 401 itself also increases (e.g., from F' to F'').

By way of example, in each information space, one or more SIBs have managing responsibilities to form the SIB distributed infrastructure. Such managing SIB is denoted, for instance, as the master SIB (mSIB). It is contemplated that there can be more than one mSIB in every information space infrastructure 401. As previously discussed, each SIB is assigned an importance factor (e.g., weight factor, stability factor). In negotiation between any two SIBs, the SIB with highest importance factor is selected to be the mSIB. Importance factor is a result of superposition between information which is provided by the intelligent connectivity controller 113, e.g. physical means which form computing environment. In the approach described herein, the intelligent connectivity controller 113 is aware of its surrounding environment (e.g., network topology) in addition to its local connectivity capabilities. The controller 113 may also be aware of the physical limitations associated with individual devices within wireless range or within the associated wired network. The aim of the interface provided by the controller 113 to the distributed framework component of the information space is to provide connectivity properties of the devices (e.g., the SIB 403) participating in the distributed network. In addition, the controller 113 hides the complexity of multi-transport control mechanisms as a connectivity cost function interface.

The next stage of the evolution of the information space infrastructure 401 is depicted in FIG. 4C. As shown, a new SIB 405 may want to join the distributed information space infrastructure 401 by sending a Join message. In one embodiment, the Join message contains authentication information to ensure that the new SIB 405 is authorized to join the information space infrastructure 401. It is anticipated that the authentication information may include any form of authentication (e.g., network address filtering, authentication keys, etc.). The mSIB 403 receives the Join message and verifies the message with an authenticator (e.g., authenticator 201 of FIG. 2 within the mSIB 403). If the verification fails, the process of the new SIB 405 joining the information space infrastructure 401 fails. Otherwise, if the authentication process by authenticator 201 ends successfully, the mSIB 403 sends a confirmation message to the SIB 405 as a response to Join message. When the confirmation response to Join message is received by the SIB 405, the SIB 405 is confirmed as a member of the distributed information space infrastructure 401.

After the Join operation is complete, the resulting infrastructure 401 of FIG. 4C includes two SIBs (e.g., mSIB 403 and SIB 405). Additional SIBs may subsequently join the information space infrastructure 401. For every new SIB that joins the information space infrastructure 401, the stability factors of the members of the new infrastructure are verified. If the stability factor of the new SIB 405 is higher than the one or more current mSIBs, the new SIB 405 will be assigned as the new mSIB (takeover). Otherwise the current mSIB is reinstated as mSIB. FIG. 4D shows an expanded version of the infrastructure 401 after several more SIBs (e.g., SIBs 407-411) have joined the infrastructure 401. In the approach described herein, the mSIBs have the highest stability factor (f") and the stability factor of the whole infrastructure (F") is calculated based on the stability factors of its members.

As shown in FIGS. 4A-4D, at least one node 413 has connectivity to the information space infrastructure 401. By way of example the node 413 is any equipment (e.g., UE 101) that communicates with the information space infrastructure 401 to access and/or manipulate the data or information stored therein. Also, the information space infrastructure 401 has connectivity to one or more information stores 415 which, in one embodiment, contain the physical storage that the data of the information space infrastructure 401 is stored on as described with respect to FIG. 2.

Figure 5:
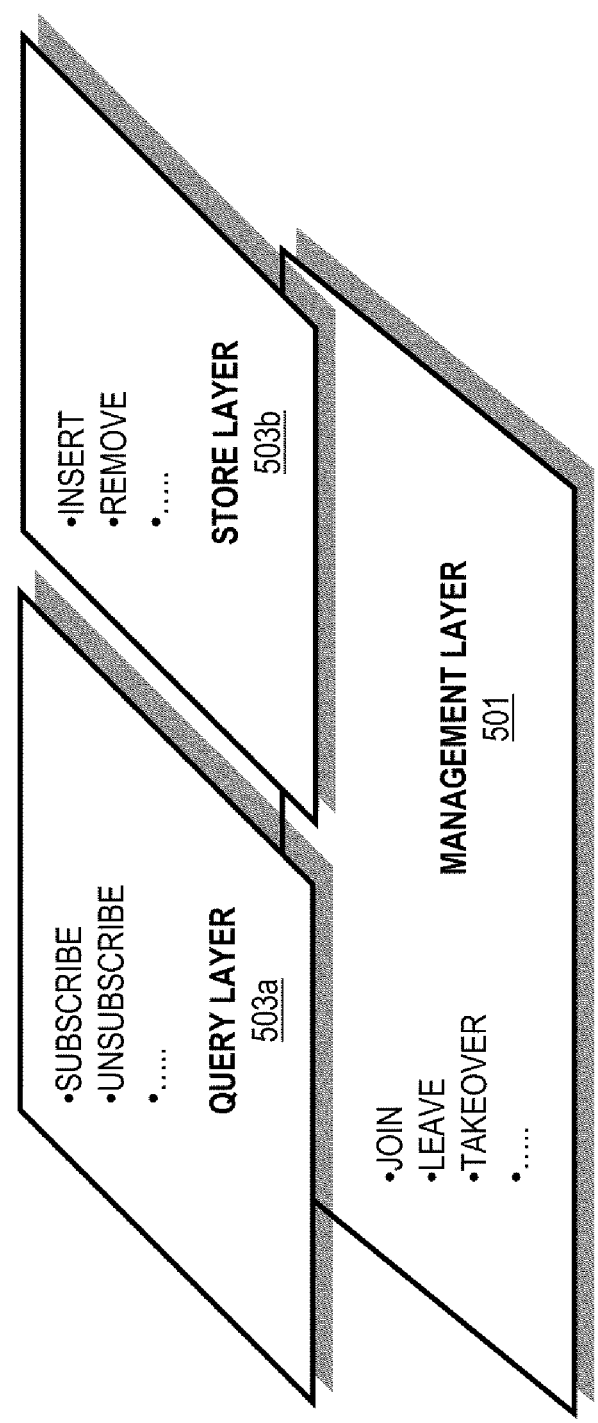
FIG. 5 is a diagram of operational layers of an information space, according to one embodiment.

FIG. 5 is a diagram of operational layers of an information space, according to one embodiment. Two main layers of operation can be recognized including, management (maintenance) layer 501 and query and store layer 503. Each layer uses a set of messages (operations) for manipulating information spaces. A list of messages of corresponding to each layer is shown in Table 1.

In one embodiment, the lowest operational level of an information space is the management (maintenance) layer 501 which includes operations for managing and maintaining the infrastructure of an information space. The distributed infrastructure management messages are used to keep correct neighbor descriptors (e.g., associated with neighboring SIBs 109) and incremental routing tables and are also used to support store and query messages. The management messages are the basic elements of a synchronization protocol between any of the SIBs 109. An incremental routing table is also maintained (e.g., by the mSIB) to track and route messages among a list of neighboring SIBs 109 within the information space 107. In one embodiment, the maintenance messages include, Join, Leave, Send, Notify, Forward, and Heartbeat (including timeout), Takeover, Heal, Remove ID, Quit, etc. The Join and Leave messages are related to operations for adding or removing an SIB 109 to the information space 107. For example, as described previously, a new SIB 109 may request to join an information space 107 by sending a Join message. If there is no response, the new SIB 109 can send a Takeover message to assume the role of the mSIB for the information space 107. By way of example, the Takeover message is sent because the new SIB 109, in the absence of a response to the initial Join request, assumes that the current mSIB (if any) is either impaired or has otherwise lost connectivity. In certain cases, one or more of the SIBs 109 in the information space 107 may attempt to repair connectivity issues using the Heal message. With respect to the Leave message, a SIB 109 that is already part of the information space 107 may send a Leave message to other SIBs 109 within the information space 107 to inform them that the SIB 109 is leaving the information space 107.

The Heartbeat message is used for informing SIBs 109 about connectivity parameters of an SIB instance. In one embodiment, the SIBs 109 include a cache memory for storing previously constructed routes; therefore messages can be routed directly, without any search within the distributed infrastructure. For navigation among the SIBs 109, two lists are constructed and used. The first list (e.g., a routing table) is a list of neighboring SIBs 109 that can be used for routing. The operation used for making this list is a simple Send. The second list (e.g., a finger table) can be used to improve overall performance and reduce the workload. This list consists of exponentially distributed IDs of all other SIBs 109 and not just neighboring SIBs 109. This list is maintained using, for instance, the Remove ID message to remove obsolete SIBs 109 or those SIBs that are otherwise no longer available.

The query and store layers 503a and 503b are the middle operational layer of an information space 107.

TABLE 1

| Message Group | Message List |
|---|---|
| Management (Maintenance) | Join, Leave, Send, Notify, Forward, Heartbeat, Takeover, Heal, Remove ID, Quit |
| Store | Insert, Remove |
| Query | Subscribe, Unsubscribe, Deliver |

Messages from the store message group 503b are used to pass information to the SIBs 109 and to direct the operation of the SIBs 109. These messages, such as Insert and Remove, provide distribution of the information. Also query messages 503a present a mechanism for information distribution which is applicable for storing group messages as well.

Messages from the query group 503a are used to pass a query to the SIBs 109 for any particular information as well as subscriptions to the SIBs 109, and to direct query operations. These messages such as Subscribe and Unsubscribe provide distribution of the persistent queries. Query messages present a mechanism for information distribution which is applicable to all query group messages. A Query message can be routed to any other SIBs 109. The Query message can be forwarded by any other SIBs 109 according to the incremental routing table, finger table, and routing decision criteria used at the SIB 109. In case of message forwarding, a notification is generated by the SIB 109. This notification can then be used to override routing decision. Such decision is obtained by means of network conditions. Thus the query tends travel along a routing path that passes each SIB 109 once. Therefore, the query route construction converges to the efficient query forwarding mechanism. The results generated in response to a query message are passed by means of a Deliver message, which returns particular information requested in the query.

Figure 6:
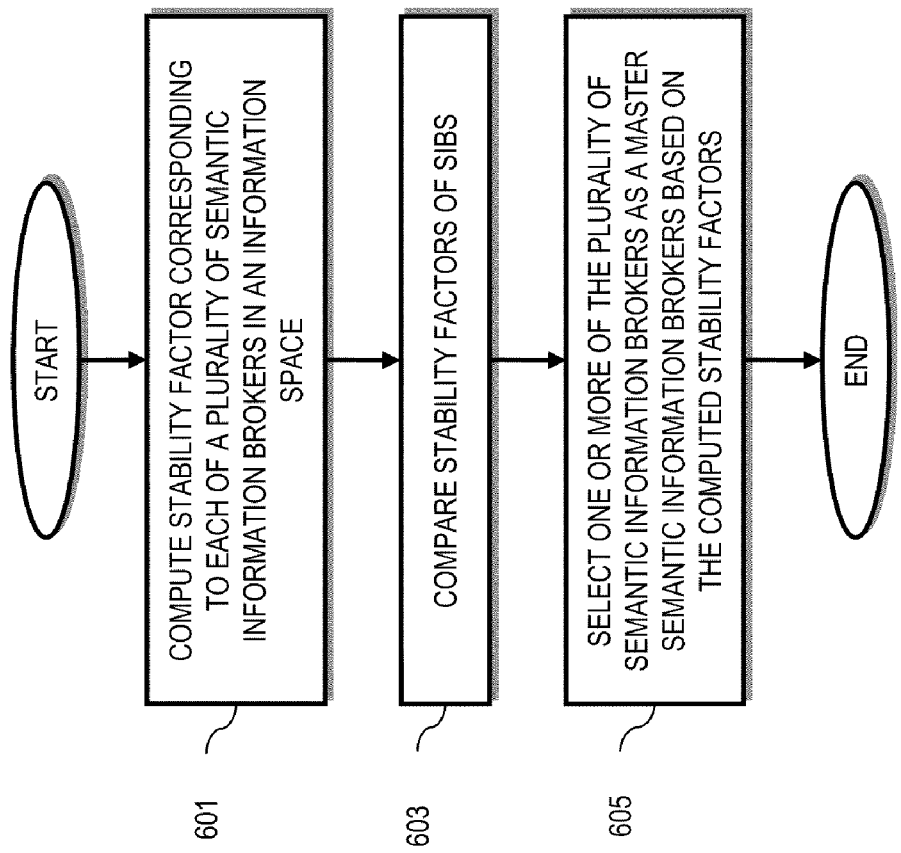
FIG. 6 is a flowchart of master semantic information broker designation process, according to one embodiment.

FIG. 6 is a flowchart of master semantic information broker designation process, according to one embodiment. Since the mSIB is an SIB 109 with one of the highest stability factors (if not the highest), in step 601 the stability factors of all the SIB members of the information space are determined. These stability factors are calculated based on current communication status, recent activity level of each SIB 109, hardware and network status, etc. In step 603, the determined stability factors are compared against each other to determine which of the SIBs 109 are associated with the highest stability factors. In step 605 one or more SIBs with highest stability factors are designated as mSIB. A mSIB is given certain privileges to access information and communicate with components that a non-master SIB does not have access to. The mSIB constructs a list of all the SIBs in the information space, the communication status among SIBs, network status and other data needed for management of communication within the information space and with other information spaces.

In certain embodiments, the computed stability factors are also compared against a predetermined threshold to determine, for instance, whether one or more communications, networking, or other parameters should be optimized to increase the overall stability of the information space 107. In one embodiment, the threshold is set at a point at which a SIB 109 with a stability factor higher than the threshold is considered stable, and a SIB 109 with a stability factor below the threshold is considered not stable. For example, if the stability factor of particular SIB 109 falls below the predetermined threshold, network conditions (e.g., bandwidth allocation, error correction schemes, etc.) may be employed to increase the stability factor of the SIB 109 to produce a stability factor in the stable range. In this way, the computed stability factors can be used to optimize the performance of the SIBs 109 in real-time.

In one embodiment, the management of the SIB distributed infrastructure is driven by the Heartbeat message exchange among SIBs 109. By way of example, each SIB has a timer to track the Heartbeat messages. The events where a SIB receives a Heartbeat message from mSIB or any neighboring SIBs within a certain period of time are tracked. In interaction between mSIB and a SIB, there are several cases when the SIB can execute a Join message as determined from the Heartbeat messages.

For example, if the timer of a SIB 109 expires and no Heartbeat messages are received from the mSIB during the expired period of time, the SIB 109 can assume that the connection between the SIB 109 and the mSIB is lost (e.g. mSIB is down). In this situation, the SIB 109 can issue a Join message to rejoin the distributed infrastructure. In some cases, the SIB 109 can also issue a Takeover message to assume the duties of the mSIB.

In another embodiment, if a SIB 109 receives a Quit message from the mSIB, the SIB 109 should leave the distributed infrastructure. In order to rejoin the infrastructure, the SIB 109 can issue a Join message.

Figure 7:
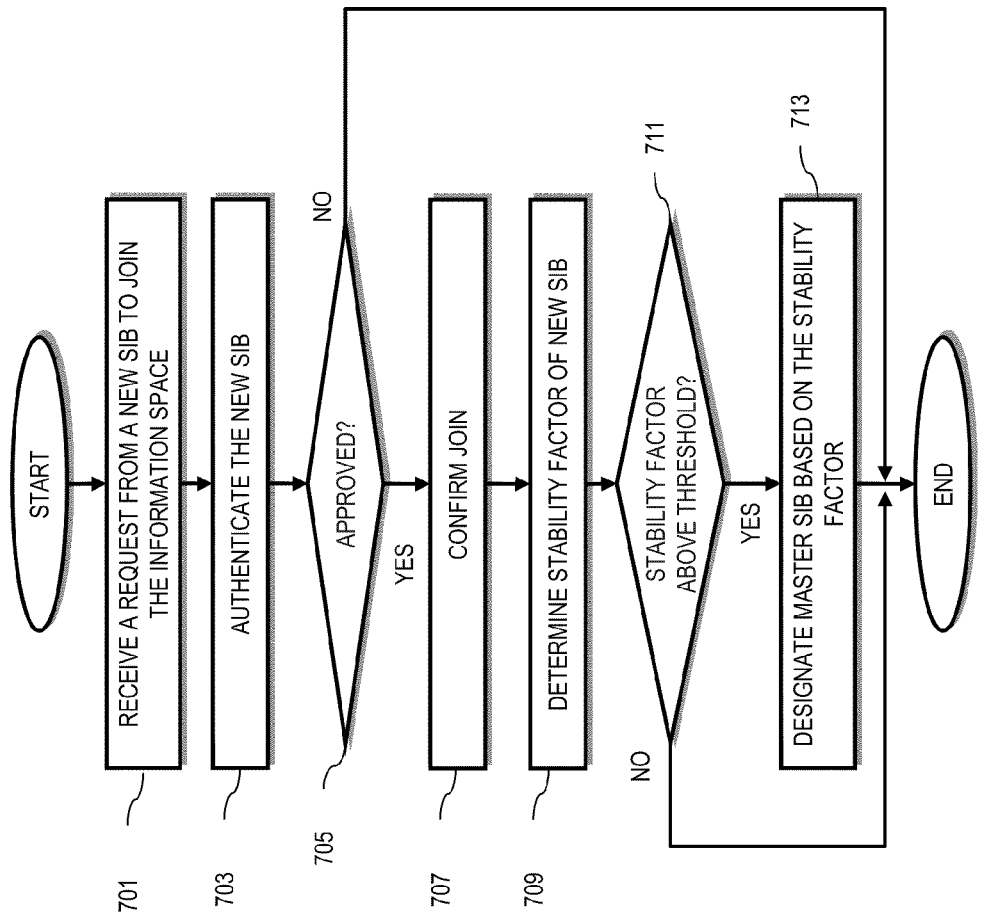
FIG. 7 is a flowchart of a processes for approving a semantic information broker for joining an information space, according to one embodiment.

FIG. 7 is a flowchart of a process for approving a semantic information broker for joining an information space, according to one embodiment. In step 701 the mSIB receives a join message from an external SIB to join the information space 107 infrastructure. The mSIB issues per step 703 a request to the authenticator 205 to validate the authenticity of the external SIB 109. If the authenticity of the external SIB is rejected per step 705 the process is terminated and the external SIB 109 is not allowed to join the information space 107 infrastructure. Otherwise, if the external SIB 109 is authenticated, the mSIB adds the external SIB 109 to the information space 107 and confirms the join per step 707. Since mSIBs are defined as the SIBs with the highest stability factors, after any change in the structure of an information space 107 the stability factors of member SIBs 109 are re-evaluated. Per step 709, the stability factor of newly joined SIB is determined. In step 711, the current mSIB evaluates the value of the stability factor for the new SIB. If the value is higher than the stability factor associated with one or more of the currently designated mSIBs, the new SIB 109 is designated as an mSIB (step 713). Otherwise, the new SIB 109 will remain as a regular member of the information space 109. The stability factors for member SIBs 109 may be computed at regular intervals or when there are detected changes in the current status of the network topologies, communication status among SIBs and among information spaces, any hardware or software issues, etc. In this way, the system 100 ensures that SIBs 109 that are associated with the highest stability factors remain or are designated as the mSIBs.

Figure 8:
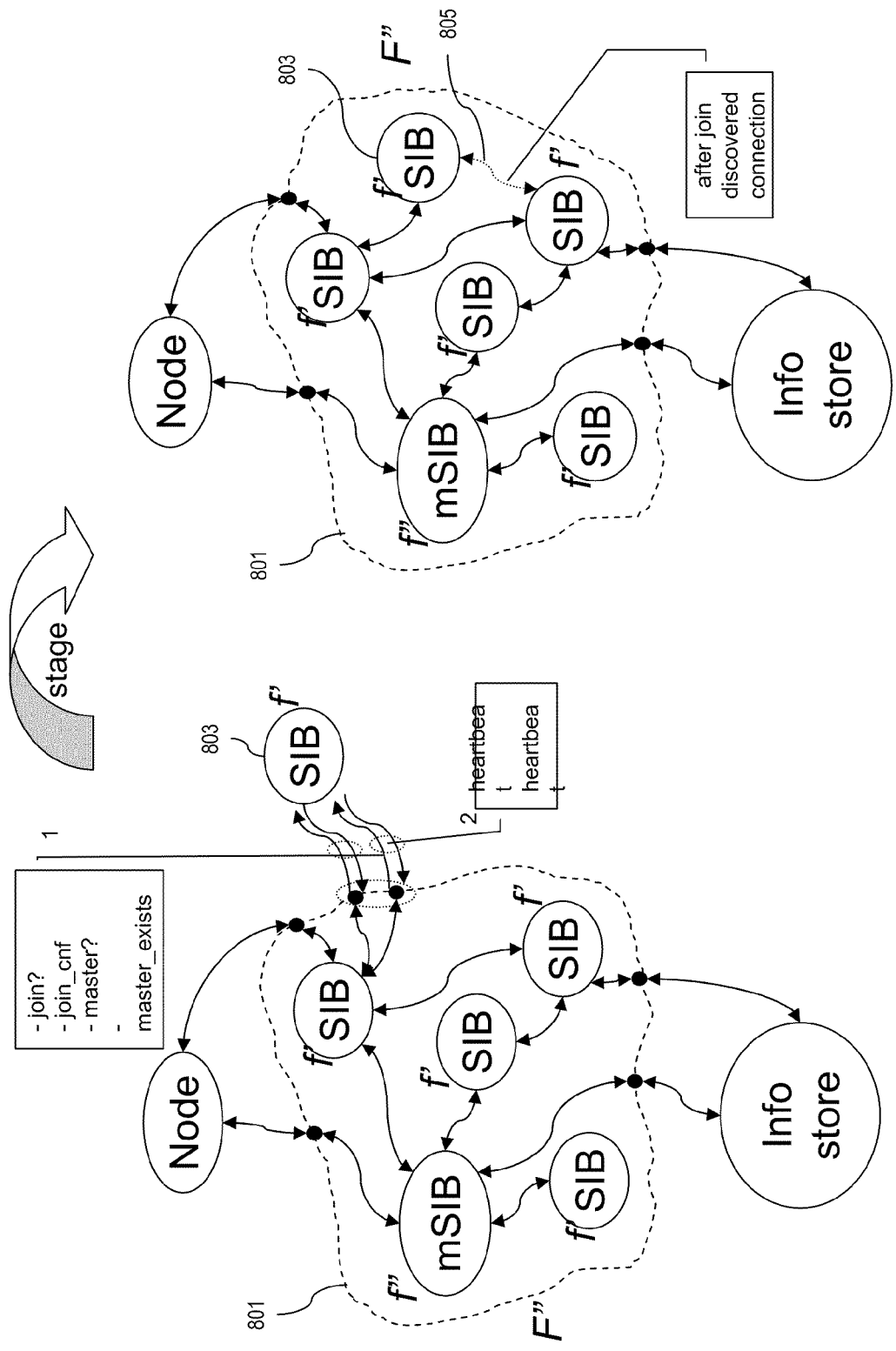
FIG. 8 is a diagram showing a semantic information broker joining an information space, according to one embodiment.

FIG. 8 is a diagram showing a semantic information broker joining an information space, according to one embodiment. As seen in FIG. 8, SIB 803 is requesting to join information space 801 with one mSIB and four regular SIBs. The request triggers, for instance, the process 700 of FIG. 7 described above, whereby the SIB 803 sends a Join message and receives a confirmation of the Join from the mSIB. After the confirmation is received by SIB 803, SIB 803 begins sending Heartbeat messages to its neighboring SIBs. In one embodiment, the neighboring SIBs with respect to SIB 803 include those SIBs with a direct connection to the SIB 803. In other embodiments, neighboring SIBs may include any SIBs within a predetermined proximity to SIB 803. This proximity may be expressed as, for instance, a number of connections away from the SIB 803 (e.g., within one or two direction connections) or some other measure of distance (e.g., physical distance, communication range, etc.). The SIB 803 also listens for Heartbeat messages from the neighboring SIBs and from the mSIB. If no Heartbeat is received from the mSIB, the SIB 803 assumes that the mSIB may be down and therefore offers to become a mSIB. However, if the SIB 803 receives a message stating that a mSIB exists, the SIB 803 may still offer to become a mSIB if stability factor is above or higher than the stability factor associated with the current mSIB. At this stage, the stability factors are re-evaluated as per step 711 of FIG. 7. If the stability factor for SIB 803 is below the stability factor of the current mSIB, it will remain as a regular member of the information space. As a regular SIB, the SIB 803 can, for instance, discover connections with neighboring SIBs to create connections such as link 805 in FIG. 8.

Figure 9:
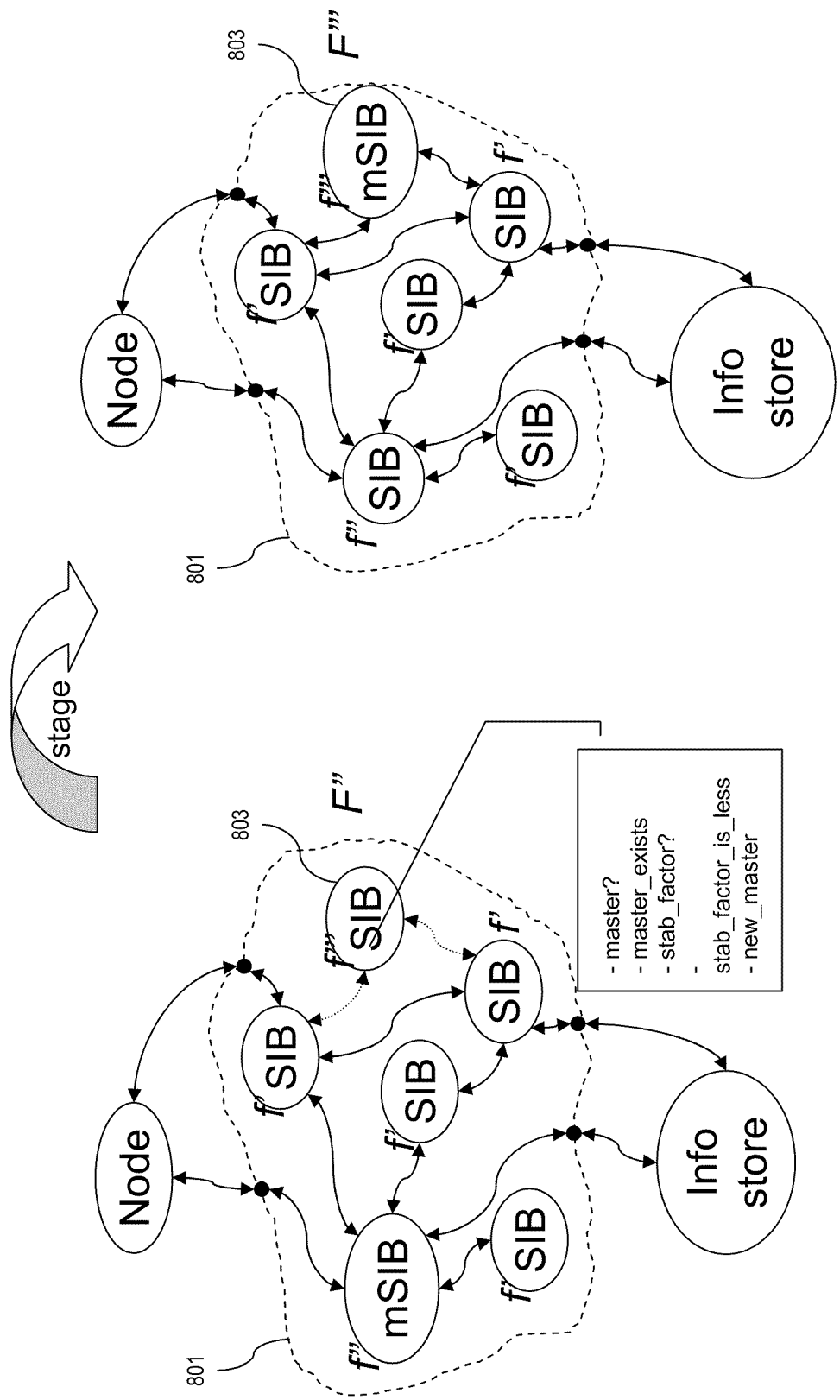
FIG. 9 is a diagram showing a semantic information broker becoming a master semantic information broker in an information space, according to one embodiment.

FIG. 9 is a diagram showing a semantic information broker becoming a master semantic information broker in an information space, according to one embodiment. The example of FIG. 9 depicts a situation in which an SIB 803 that is already a part of the information space 801 performs the process for determining whether a mSIB exists and then offering to become the mSIB (e.g., a takeover process). The process of FIG. 9 is similar to the process described with respect to FIG.

8 with the exception that the SIB 803 need not request to join the information space 801. In particular, the SIB 803 determines whether the mSIB exists and is responding. If the mSIB exists, the SIB 803 initiates a process to re-evaluate the stability factors of the SIBs with in the information space 801. In this case, the SIB 803 has a stability factor that is higher than the current mSIB and assumes the mSIB responsibilities (e.g., a takeover process).

In one embodiment, if during the process of mSIB handover (the joining SIB becoming the new mSIB) the SIB 803 receives no notification that another mSIB exists, the SIB 803 assumes that it is the only mSIB. However, if the SIB still receives a Quit message for a current mSIB during the handover, the SIB 803 abandons the handover process. The SIB 803 can then attempt the takeover process at another time.

In another embodiment, during the lifetime of an infrastructure, due to fluctuations in stability factors of any SIB, including current mSIBs, and also due to involuntary faults in system, the managing functionality can periodically migrate to any SIB member of the infrastructure. As a result, the infrastructure will be evolving from one stage to another based on modification of stability factors and changes in the mSIB where the master position is taken over by another SIB.

Figure 10A:
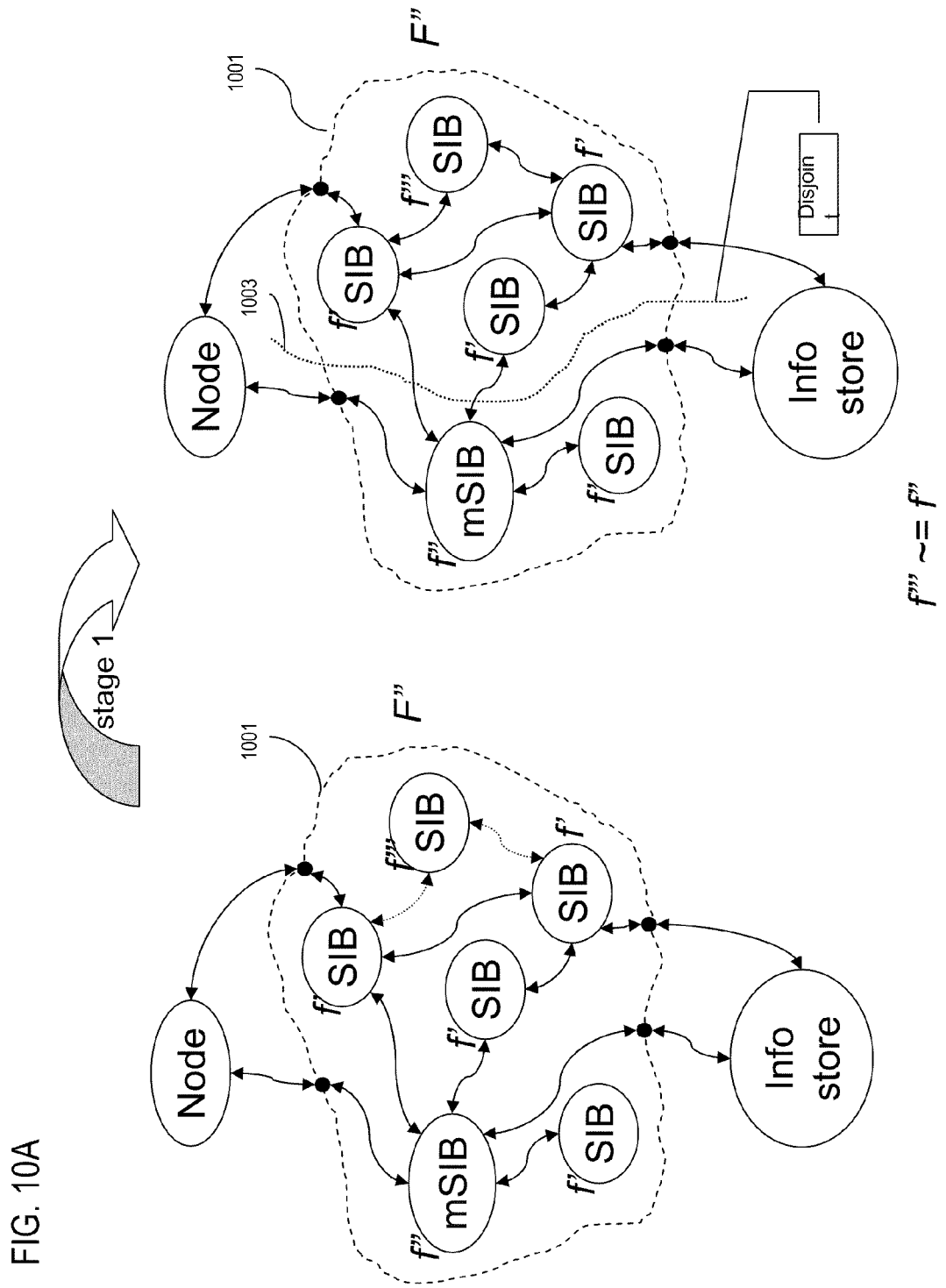
FIGS. 10A-10C are diagrams of a healing process, according to one embodiment.
Figure 10B:
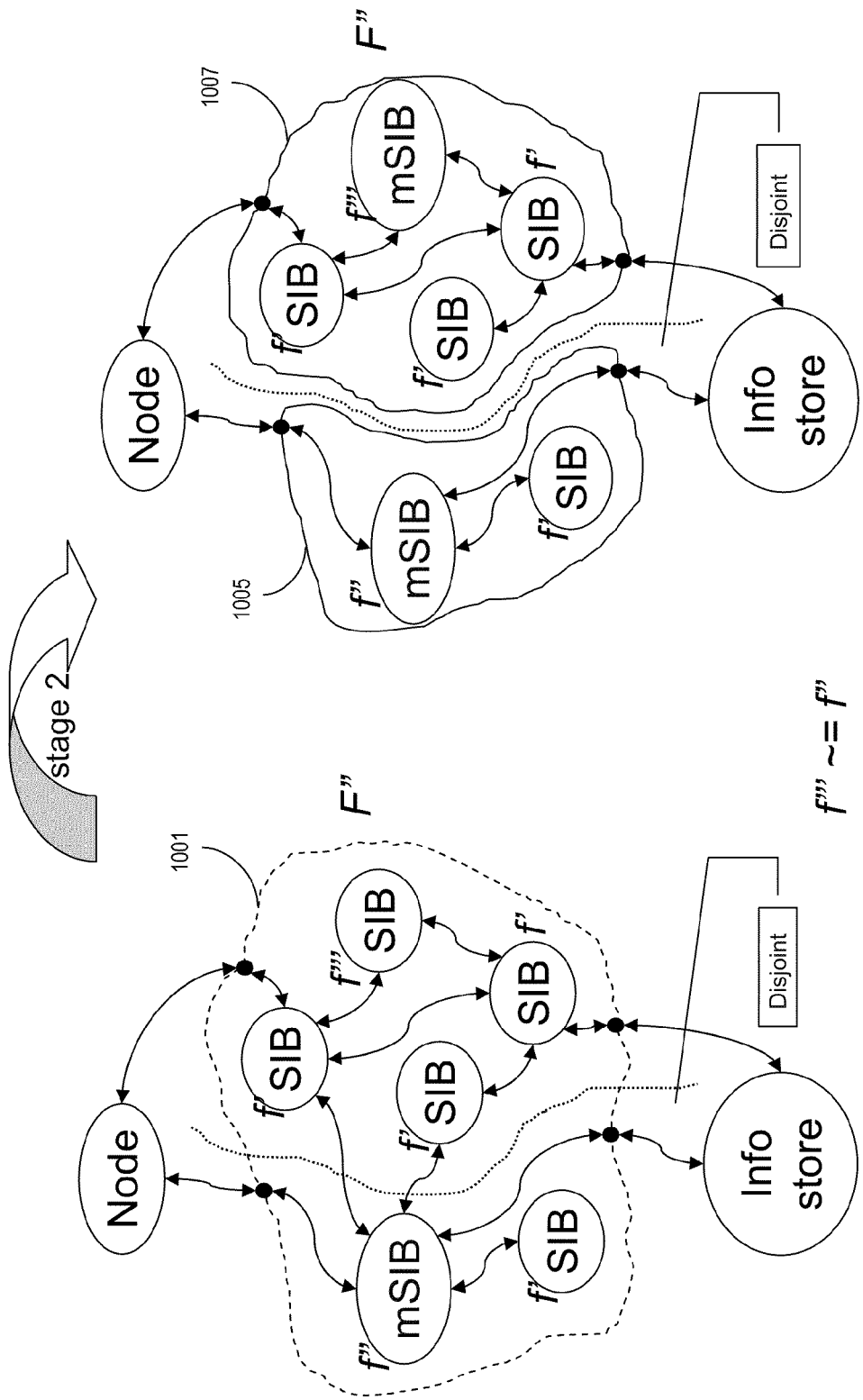
Figure 10C:
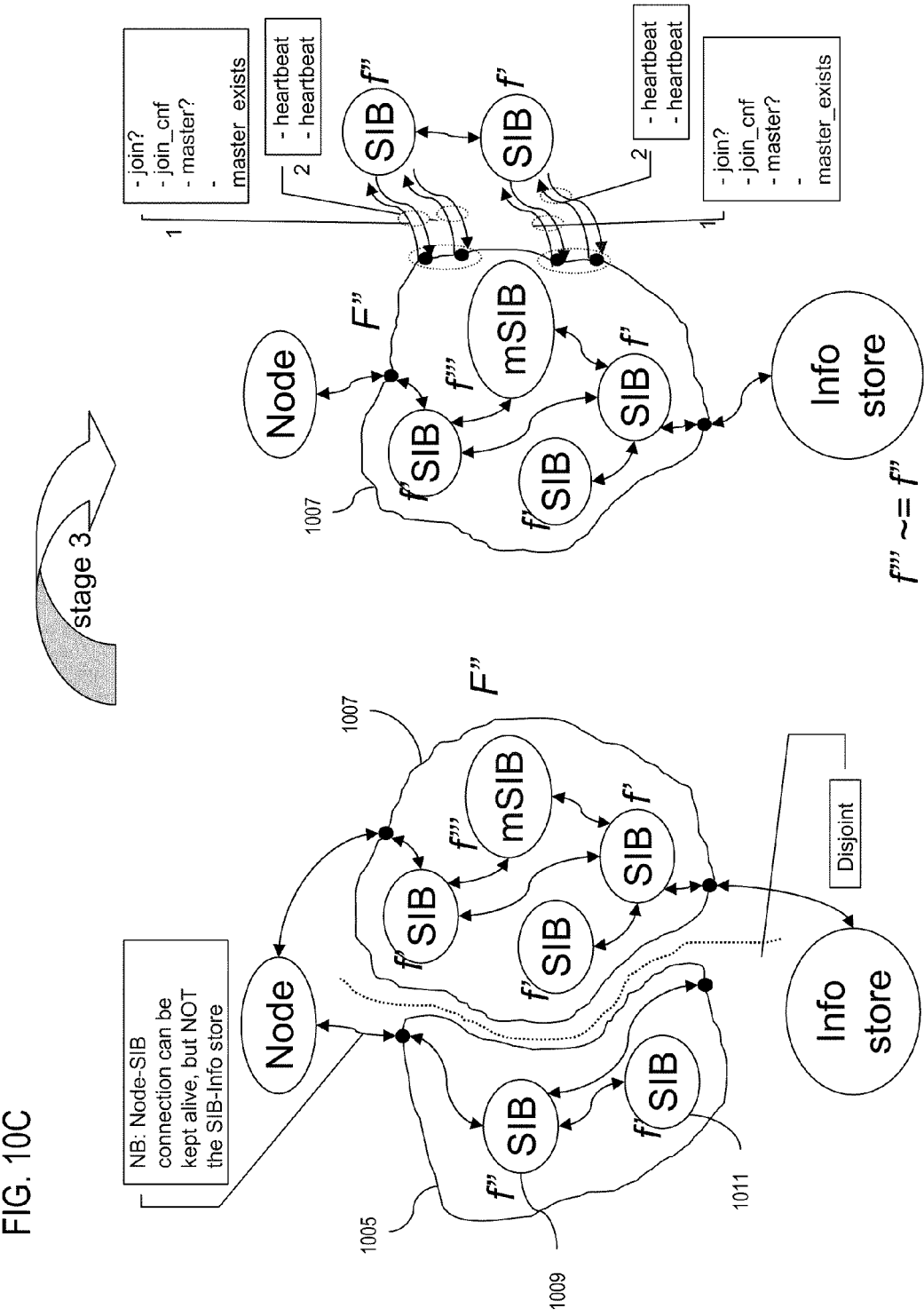

FIGS. 10A-10C are diagrams of a healing process, according to one embodiment. In one embodiment, the communication between parts of an information space 1101 may be lost. This may happen, for instance, due to network problems or hardware failures. As shown in FIG. 10A, the communication pathway between two parts of the information space 1001 is broken along dotted line 1003. In this situation, the SIBs on the two sides of the broken connection are not able to communicate with each other. The process that the system takes in order to solve the issue and reconnect the SIBs is referred to as a Healing process.

FIG. 10B is the continuation of FIG. 10A where the broken communication link has resulted in dividing the information space 1101 into two disjointed portions (e.g., portions 1005 and 1007) divided by line 1003. Because the SIBs are self-monitoring (e.g., can determine whether an mSIB exists), each portion can reassess the stability factors among the SIBs within the respective portions 1005 and 1007 to designate a mSIB separately for each portion 1005 and 1007. In the diagram of FIG. 11B, the original mSIB has restated as the mSIB for space 1105, while in new space 1107 one of the SIBs with highest stability level has assumed the mSIB position. In this case both spaces 1105 and 1107 have connectivity to the same external node and to the same information store.

In another embodiment, the broken connection may cause the connectivity between the SIBs and either the node or the information store to be lost. FIG. 11C depicts a situation where the 1005 portion of the initial space 1001 has lost connectivity to the information store. In this case, the Healing process (e.g., as performed by the distribution management system 103a-103n) dissolves the space 1005. Dissolving the information space 1105 cleaves SIBs 1009 and 1011 that have lost connection. As shown, the other portion 1007 of the original information space 1001 is operational and remains connected to both the node and the information. In the next step, the distribution management system 103a-103n causes SIBs 1009 and 1011 to initiate Join messages to reconnect with other SIBs of the information space 1007. After the disconnected SIBs such as 1009 and 1011 joined the information space 1007, the information space 1007 in essence represents a reconstituted equivalent of the original information space 1001.

Figure 11A:
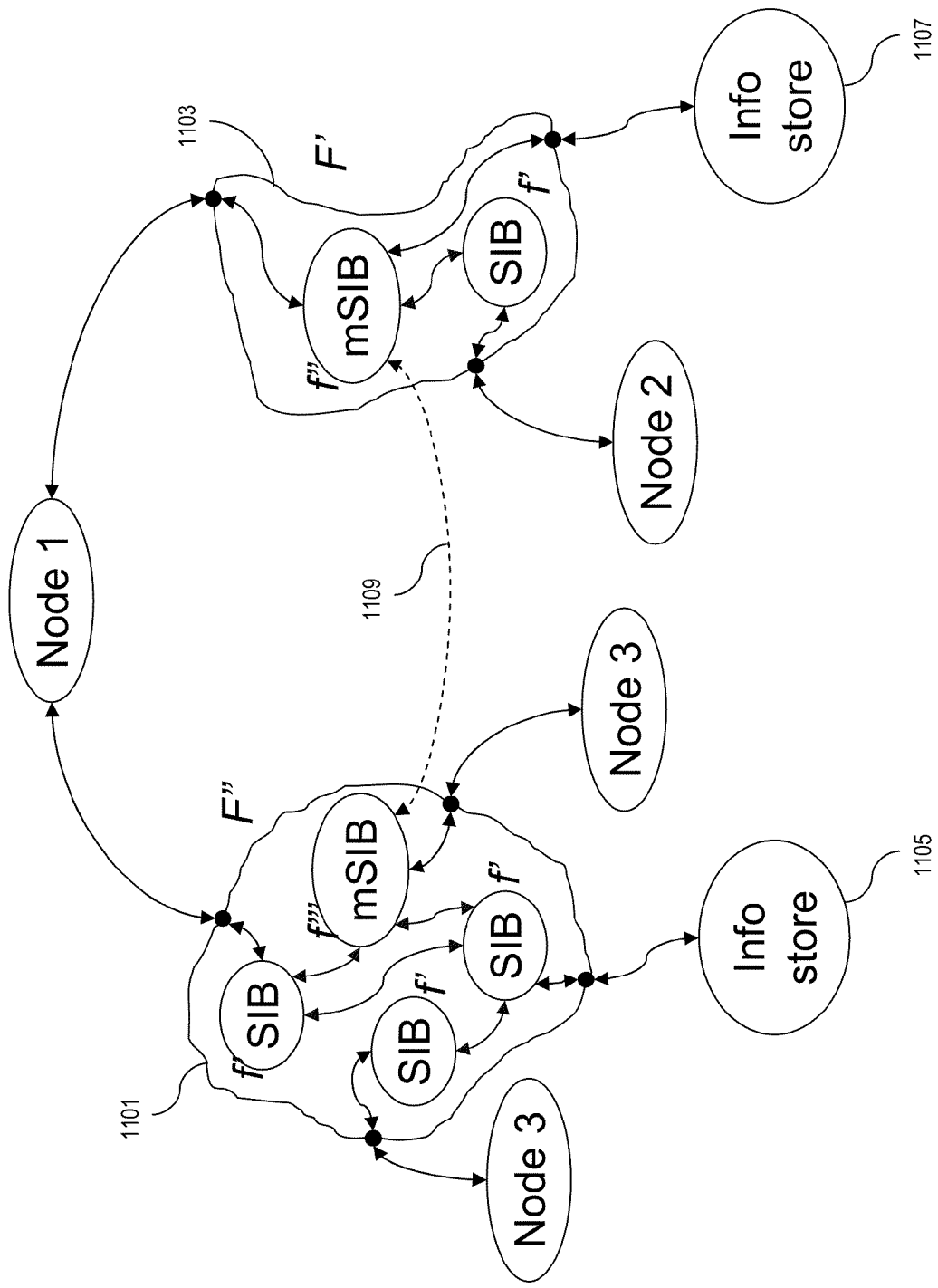
FIGS. 11A-11B are diagrams of symmetric and asymmetric distribution, according to various embodiments.
Figure 11B:
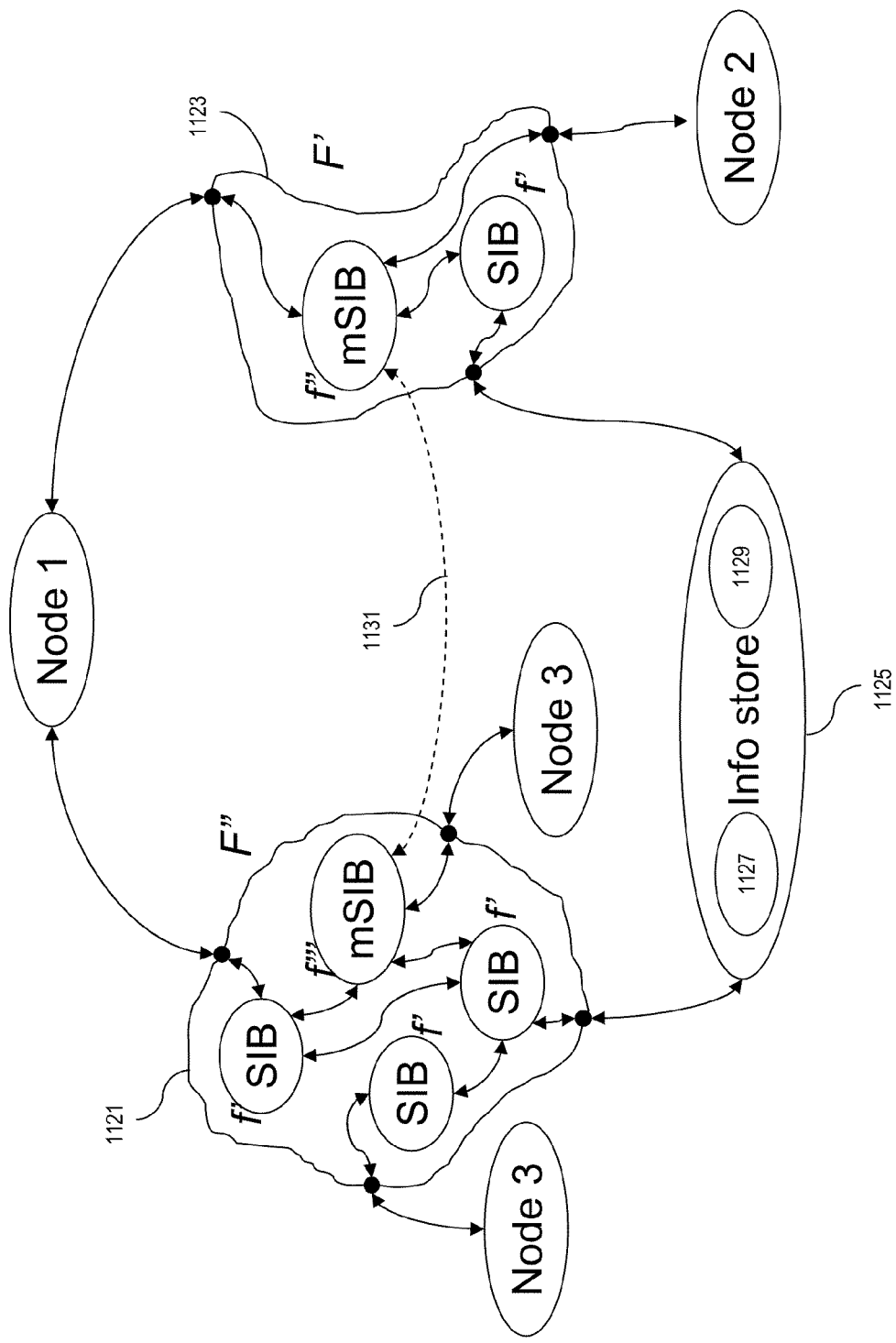

FIGS. 11A-11B are diagrams of symmetric and asymmetric distribution, according to various embodiments. In FIG. 11A, two information spaces 1101 and 1103 have access to separate information stores 1105 and 1107 respectively. In this situation, separate access rights can be defined for each information store 1105-1107 and no interference will arise from accessing the information. Even though the distribution of information and queries in FIG. 11A is asymmetric, the separation of information stores 1105 and 1107 does not impose extra restrictions on access to either information store 1105 or 1107. As seen in FIG. 11A, communication between the two information spaces 1101 and 1103 is performed by their respective mSIBs using, for instance, asymmetric communications via the link 1109. However, the internal communications within each information space 1101 and 1103 is symmetric.

FIG. 11B has a similar structure to FIG. 11B with the difference that both of the information spaces 1121 and 1123 have access to a common information store 1225, portions of which are assigned to each information space 1121 and 1123. The portion 1127 of the information store 1125 is the store for data related to information space 1121 and the portion 1129 contains data for information space 1123. In this case, access to the information store 1125 is strictly controlled because even though each of the information spaces 11121 and 1123 may have different characteristics and access rights defined, they have to abide by the rules of the same information store 1125. In one embodiment, information access is managed by distribution management systems 103a-103n.

The processes described herein for optimizing information and query distribution in information spaces may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
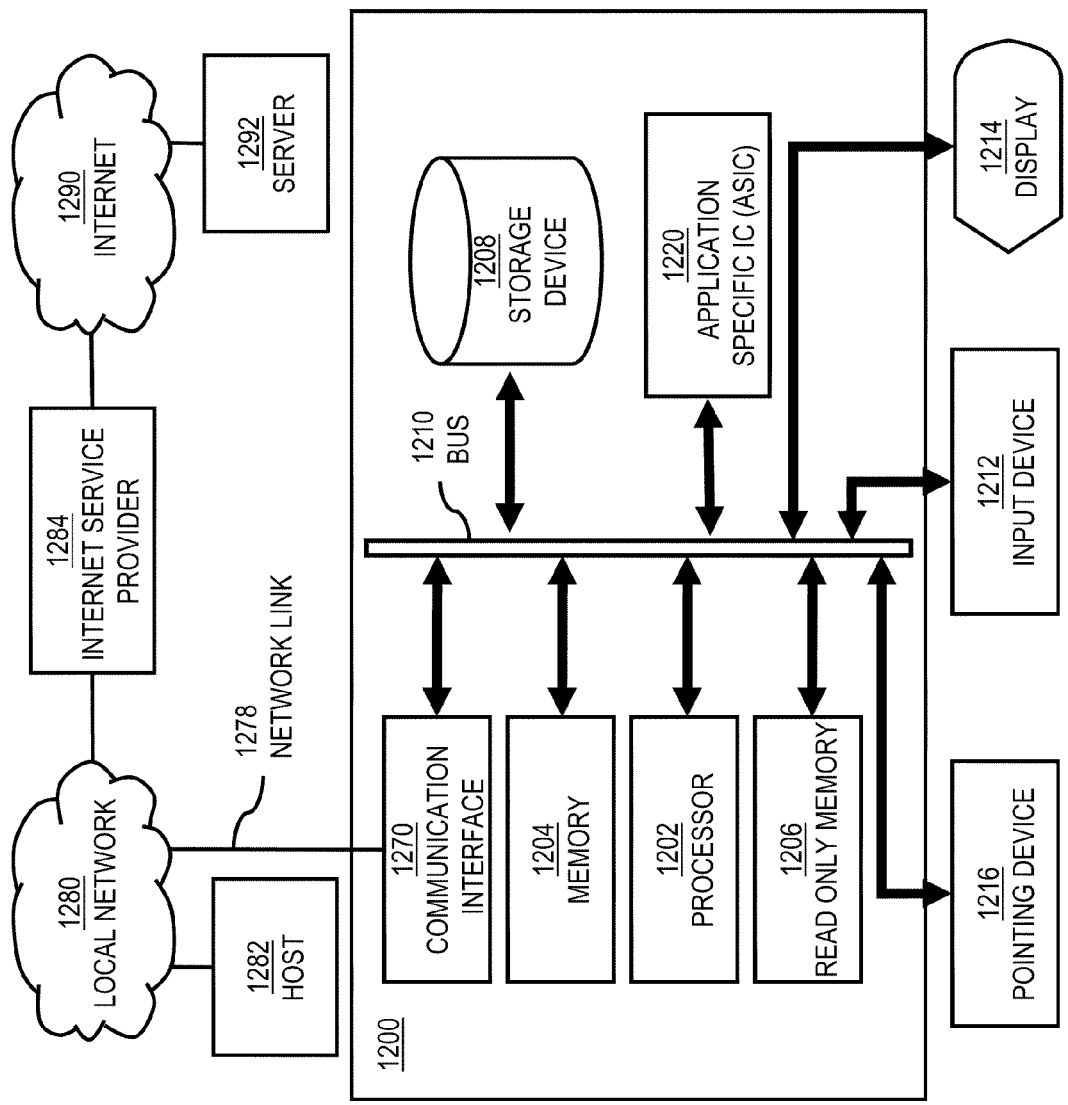
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to optimize information and query distribution in information spaces as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of optimizing information and query distribution in information spaces.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to optimize information and query distribution in information spaces. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for optimizing information and query distribution in information spaces. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for optimizing information and query distribution in information spaces, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for optimizing information and query distribution in information spaces.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
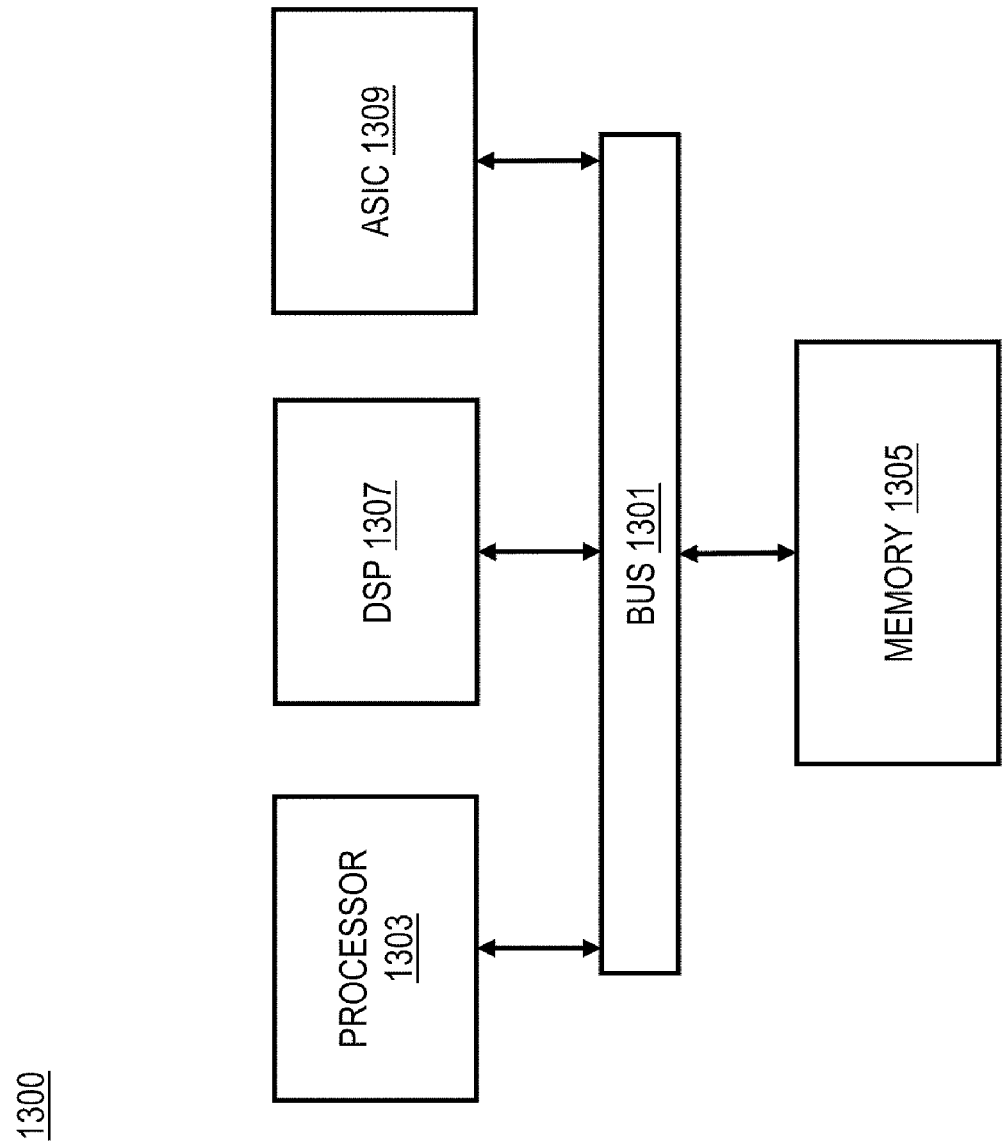
FIG. 13 is a diagram of a chip set that can be used to implement an embodiment of the invention.

FIG. 13 illustrates a chip set 1300 upon which an embodiment of the invention may be implemented. Chip set 1300 is programmed to optimize information and query distribution in information spaces as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of optimizing information and query distribution in information spaces.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to optimize information and query distribution in information spaces. The memory 1305 also stores the data associated with or generated by the execution of the inventive steps.

Figure 14:
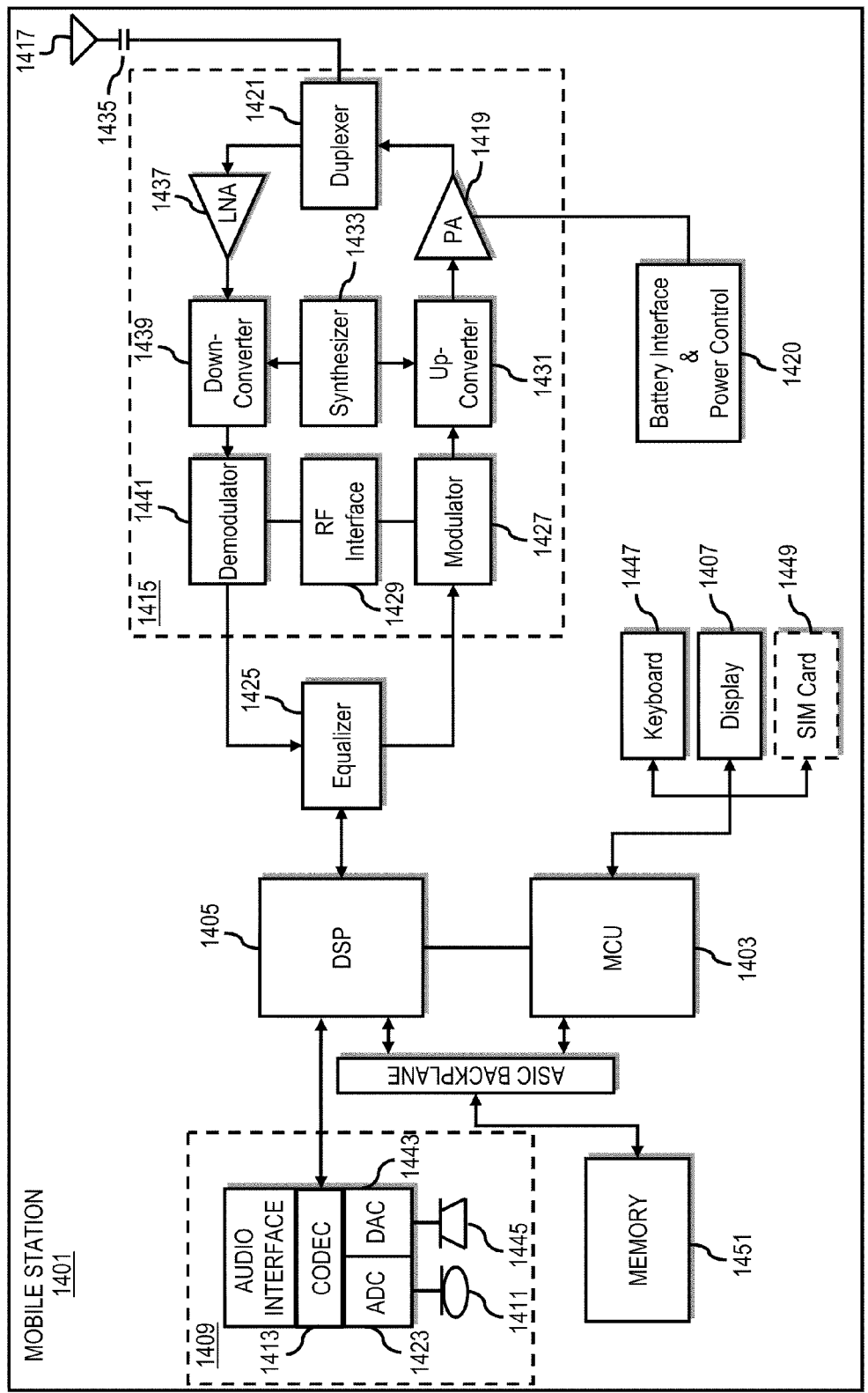
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1400, or a portion thereof, constitutes a means for performing one or more steps of optimizing information and query distribution in information spaces. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of optimizing information and query distribution in information spaces. The display 14 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to optimize information and query distribution in information spaces. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a request, from a device, to perform an information management operation or query directed at one or more semantic information brokers;
    determining provenance, ownership, or privacy of information within the one or more semantic information brokers;
    determining a strategy for distributing the operation or query among the one or more semantic information brokers based, at least in part, on the provenance, ownership, or privacy information; and
    distributing the operation or query among the one or more semantic information brokers according to the determined strategy.

2. A method of claim 1, wherein the determination of the strategy is based, at least in part, on credentials associated with the device.

3. A method of claim 2, wherein the one or more semantic information brokers comprise one or more information spaces, the method further comprising:
    computing a stability factor corresponding to each of the one or more semantic information brokers; and
    selecting one or more of the semantic information brokers as master semantic information brokers for a respective one of the information spaces based on the computed stability factors,
    wherein the one or more master semantic information brokers manage communication among the semantic information brokers within the respective information space.

4. A method of claim 3, wherein the stability factors are computed based on local connectivity capabilities, connectivity capabilities of a surrounding environment, physical computing means, information management infrastructure, neighboring devices, or a combination thereof.

5. A method of claim 3, further comprising:
    receiving a request from an external semantic information broker to join the respective one of the information spaces;
    authenticating the external semantic information broker in response to the request;
    determining a stability factor for the external semantic information broker based on the authentication;
    comparing the stability factor for the external semantic information broker against the stability factors of the one or more master semantic information brokers of the respective information space; and
    adding the external semantic information broker to the respective information space as a new master semantic information broker based on the comparison.

6. A method of claim 5, wherein the external semantic information broker assumes a role of the master semantic information broker if no response to the request is provided within a predetermined period of time.

7. A method of claim 3, further comprising:
    monitoring a heartbeat signal from each of the plurality of semantic information brokers in the respective information space;
    detecting whether a connection to one or more of the plurality of semantic information brokers is lost based on the monitored heartbeat signals;
    computing a new stability factor for each of the semantic information brokers for which a connection is detected; and
    selecting one or more new master semantic information brokers based on the new stability factors.

8. A method of claim 3, further comprising:
    periodically computing a new stability factor for each of the semantic information brokers;
    determining whether one or more of the new stability factors is below a predetermined stability threshold; and
    optimizing the semantic information brokers based on the determination.

9. A method of claim 3, wherein the determined strategy includes asymmetric distribution, the method further comprising:
    determining whether the request relates to information stored in more than one of the information spaces;
    if the request relates to more than one of the information spaces, determining a set of information from a first information space to transmit to a second information space to complete the request;
    recording provenance information and related metadata in the set of information; and
    causing, at least in part, actions that result in transmission of the set of information from the first information space to the second information space.

10. An apparatus comprising:
    at least one processor; and
    at least one memory including computer program code,
    the at least one memory and the computer program code configured to, with the at least one processor, cause the apparatus to perform at least the following,
        receive a request, from a device, to perform an information management operation or query directed at one or more semantic information brokers,
        determine provenance, ownership, or privacy of information within the one or more semantic information brokers, determine a strategy for distributing the operation or query among the one or more semantic information brokers based, at least in part, on the provenance, ownership, or privacy information, and distribute the operation or query among the one or more semantic information brokers according to the determined strategy.

11. An apparatus of claim 10, wherein the determination of the strategy is based, at least in part, on credentials associated with the device.

12. An apparatus of claim 11, wherein the one or more semantic information brokers comprise one or more information spaces, and the apparatus is further caused to:

compute a stability factor corresponding to each of the one or more semantic information brokers; and select one or more of the semantic information brokers as master semantic information brokers for a respective one of the information spaces based on the computed stability factors, wherein the one or more master semantic information brokers manage communication among the semantic information brokers within the respective information space.

13. An apparatus of claim 12, wherein the stability factors are computed based on local connectivity capabilities, connectivity capabilities of a surrounding environment, physical computing means, information management infrastructure, neighboring devices, or a combination thereof.

14. An apparatus of claim 12, wherein the apparatus is further caused to:

receive a request from an external semantic information broker to join one or the respective information spaces;

authenticate the external semantic information broker in response to the request;

determine a stability factor for the external semantic information broker based on the authentication;

compare the stability factor for the external semantic information broker against the stability factors of the one or more master semantic information brokers of the respective information space; and add the external semantic information broker to the respective information space as a new master semantic information broker based on the comparison.

15. An apparatus of claim 14, wherein the external semantic information broker assumes a role of the master semantic information broker if no response to the request is provided within a predetermined period of time.

16. An apparatus of claim 12, wherein the apparatus is further caused to:

monitor a heartbeat signal from each of the plurality of semantic information brokers in the respective information spaces;

detect whether a connection to one or more of the plurality of semantic information brokers is lost based on the monitored heartbeat signals;

compute a new stability factor for each of the semantic information brokers for which a connection is detected; and select one or more new master semantic information brokers based on the new stability factors.

17. An apparatus of claim 12, wherein the apparatus is further caused to:

periodically compute a new stability factor for each of the semantic information brokers;

determine whether one or more of the new stability factors is below a predetermined stability threshold; and optimize the semantic information brokers based on the determination.

18. An apparatus of claim 10, wherein the determined strategy includes asymmetric distribution, and the apparatus is further caused to:

determine whether the request relates to information stored in more than one of the information spaces;

if the request relates to more than one of the information spaces, determine a set of information from a first information space to transmit to a second information space to complete the request;

record provenance information and related metadata in the set of information; and cause, at least in part, actions that result in transmission of the set of information from the first information space to the second information space.

19. A non-transitory computer-readable storage medium carrying one or more sequences of one or more instructions which, when executed by one or more processors, cause an apparatus to at least perform the following steps:

receiving a request, from a device, to perform an information management operation or query directed at one or more semantic information brokers;

determining provenance, ownership, or privacy of information within the one or more semantic information brokers;

determining a strategy for distributing the operation or query among the one or more semantic information brokers based, at least in part, on the provenance, ownership, or privacy information; and distributing the operation or query among the one or more semantic information brokers according to the determined strategy.

20. A non-transitory computer-readable storage medium of claim 19, wherein the one or more semantic information brokers comprise one or more information spaces, and the apparatus is caused to further perform:

computing a stability factor corresponding to each of the one or more semantic information brokers; and selecting one or more of the semantic information brokers as master semantic information brokers for a respective one of the information spaces based on the computed stability factors, wherein the one or more master semantic information brokers manage communication among the semantic information brokers within the respective information space.

* * * * *